United States Patent
Park et al.

(10) Patent No.: US 9,606,811 B2
(45) Date of Patent: Mar. 28, 2017

(54) OPERATING METHOD OF DATA STORAGE DEVICE

(71) Applicant: SK hynix Inc., Gyeonggi-do (KR)

(72) Inventors: Jong Ju Park, Gyeonggi-do (KR);
Dong Jae Shin, Gyeonggi-do (KR);
Young Jin Park, Gyeonggi-do (KR)

(73) Assignee: SK Hynix Inc., Gyeonggi-do (KR)

(*) Notice: Subject to any disclaimer, the term of this patent is extended or adjusted under 35 U.S.C. 154(b) by 92 days.

(21) Appl. No.: 14/566,266

(22) Filed: Dec. 10, 2014

(65) Prior Publication Data
US 2016/0055008 A1  Feb. 25, 2016

(30) Foreign Application Priority Data

Aug. 20, 2014  (KR) .................. 10-2014-0108526

(51) Int. Cl.
G06F 9/24  (2006.01)
G06F 9/44  (2006.01)

(52) U.S. Cl.
CPC .............. G06F 9/4406 (2013.01); G06F 9/24 (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | | | |
|---|---|---|---|---|
| 6,292,890 B1* | 9/2001 | Crisan | ................... | G06F 9/4416 709/220 |
| 6,393,559 B1* | 5/2002 | Alexander | ................ | G06F 1/24 713/1 |
| 7,669,048 B2* | 2/2010 | Frank | .................... | G06F 21/572 705/400 |
| 8,386,672 B2* | 2/2013 | Tsuei | .................... | G06F 1/3203 710/62 |
| 8,438,423 B1* | 5/2013 | Barkelew | ............ | G06F 11/1417 713/2 |
| 9,201,661 B2* | 12/2015 | Lin | ........................ | G06F 9/4401 |
| 2003/0110368 A1* | 6/2003 | Kartoz | .................. | G06F 9/4411 713/1 |
| 2006/0041738 A1* | 2/2006 | Lai | ....................... | G06F 11/1417 713/2 |
| 2007/0028084 A1* | 2/2007 | Yu | ........................... | H04L 67/34 713/1 |
| 2007/0260867 A1* | 11/2007 | Ethier | ................... | G06F 9/4418 713/2 |
| 2008/0148038 A1* | 6/2008 | Abe | ....................... | G06F 11/073 713/2 |

(Continued)

FOREIGN PATENT DOCUMENTS

KR  1020130108926  10/2013

*Primary Examiner* — Zahid Choudhury
(74) *Attorney, Agent, or Firm* — IP & T Group LLP

(57) ABSTRACT

An operating method of a data storage device includes determining whether the data storage device is in a main boot mode or a sub boot mode, based on data stored in a boot mode register; executing a main boot code stored in a ROM, when the data storage device is determined to be in the main boot mode; and executing a sub boot code loaded on a working memory, when the data storage device is determined to be in the sub boot mode, and then, executing the main boot code.

21 Claims, 20 Drawing Sheets

(56) References Cited

U.S. PATENT DOCUMENTS

| | | | |
|---|---|---|---|
| 2010/0049961 A1* | 2/2010 | Liao | G06F 11/1433 713/2 |
| 2011/0246760 A1* | 10/2011 | Ueta | G06F 9/4401 713/2 |
| 2012/0011393 A1* | 1/2012 | Roberts | G06F 11/1417 714/6.3 |
| 2012/0239918 A1* | 9/2012 | Huang | G06F 9/4401 713/2 |
| 2012/0272050 A1* | 10/2012 | Seo | G06F 11/1417 713/2 |
| 2013/0042095 A1* | 2/2013 | Jung | G06F 9/24 713/2 |
| 2014/0229727 A1* | 8/2014 | Jun | G06F 9/4418 713/2 |
| 2014/0325197 A1* | 10/2014 | Lewis | G06F 9/4418 713/2 |

\* cited by examiner

OPERATING METHOD OF DATA STORAGE DEVICE

CROSS-REFERENCES TO RELATED APPLICATION

The present application claims priority under 35 U.S.C. §119(a) to Korean application number 10-2014-0108526, filed on Aug. 20, 2014, in the Korean Intellectual Property Office, which is herein incorporated by reference in its entirety.

BACKGROUND

1. Technical Field

Various embodiments relate to a data storage device, and more particularly, to an operating method of a data storage device capable of quickly performing a booting operation without an error.

2. Related Art

Recently, owed to the widespread ubiquitous computing environment, computer systems can be used anytime and anywhere. Due to this fact, the use of portable electronic devices such as mobile phones, digital cameras, and notebook computers has rapidly increased. In general, such portable electronic devices use a data storage device such as a memory device. The data storage device may include a main memory device and/or an auxiliary memory device.

A data storage device such as a memory device provides advantages in that: no moving parts are required, stability and durability are excellent, information access speed is high, and power consumption is small. Data storage devices having such advantages include a universal serial bus (USB) memory device, memory cards having various interfaces, a universal flash storage (UFS) device, and a solid state drive (SSD).

In order to respond to various requests from a host device, such as a portable electronic appliance, and perform management operations in a data storage device, the data storage device may load and drive an operation code. When power turns on, the data storage device may load the operation code on a working memory, and may perform a booting operation for entering a state capable of driving the operation code.

For instance, when the data storage device is in a malfunction state, the data storage device may be reset. Then, the booting operation may be performed again. For another example, where the data storage device transitions from a power saving mode to a normal mode, the booting operation may be performed again. In any case, the data storage device may not normally operate until after the booting operation is completed without an error.

SUMMARY

Various embodiments are directed to an operating method of a data storage device capable of quickly performing a booting operation without an error.

In an embodiment, an operating method of a data storage device may include: determining whether the data storage device is in a main boot mode or a sub boot mode, based on data stored in a boot mode register; executing a main boot code stored in a ROM, when the data storage device is determined to be in the main boot mode; and executing a sub boot code loaded on a working memory, when the data storage device is determined to be in the sub boot mode, and then, executing the main boot code.

In an embodiment, an operating method of a data storage device may include: setting a power saving mode register before entering a power saving mode; determining whether it is a main boot mode or a sub boot mode, based on data stored in the power saving mode register, in the case of returning from the power saving mode to a normal mode; executing a main boot code stored in a ROM, when it is determined that it is the main boot mode; and executing a sub boot code retained in a working memory, when it is determined that it is the sub boot mode.

In an embodiment, an operating method of a data storage device may include: determining whether it is a main boot mode or a sub boot mode, based on data stored in a boot mode register; executing a main boot code stored in a ROM, when it is determined that it is the main boot mode; determining whether return is made from a power saving mode, based on data stored in a power saving mode register, when it is determined that it is the sub boot mode; executing a first sub boot code stored in a working memory, when it is determined that return is not made from the power saving mode; and executing a second sub boot code stored in the working memory, when it is determined that return is made from the power saving mode.

According to embodiments, the booting operation of a data storage device may be quickly performed without an error. Due to this fact, the reliability and operation speed of the data storage device may be improved.

DETAILED DESCRIPTION

Figure 1:
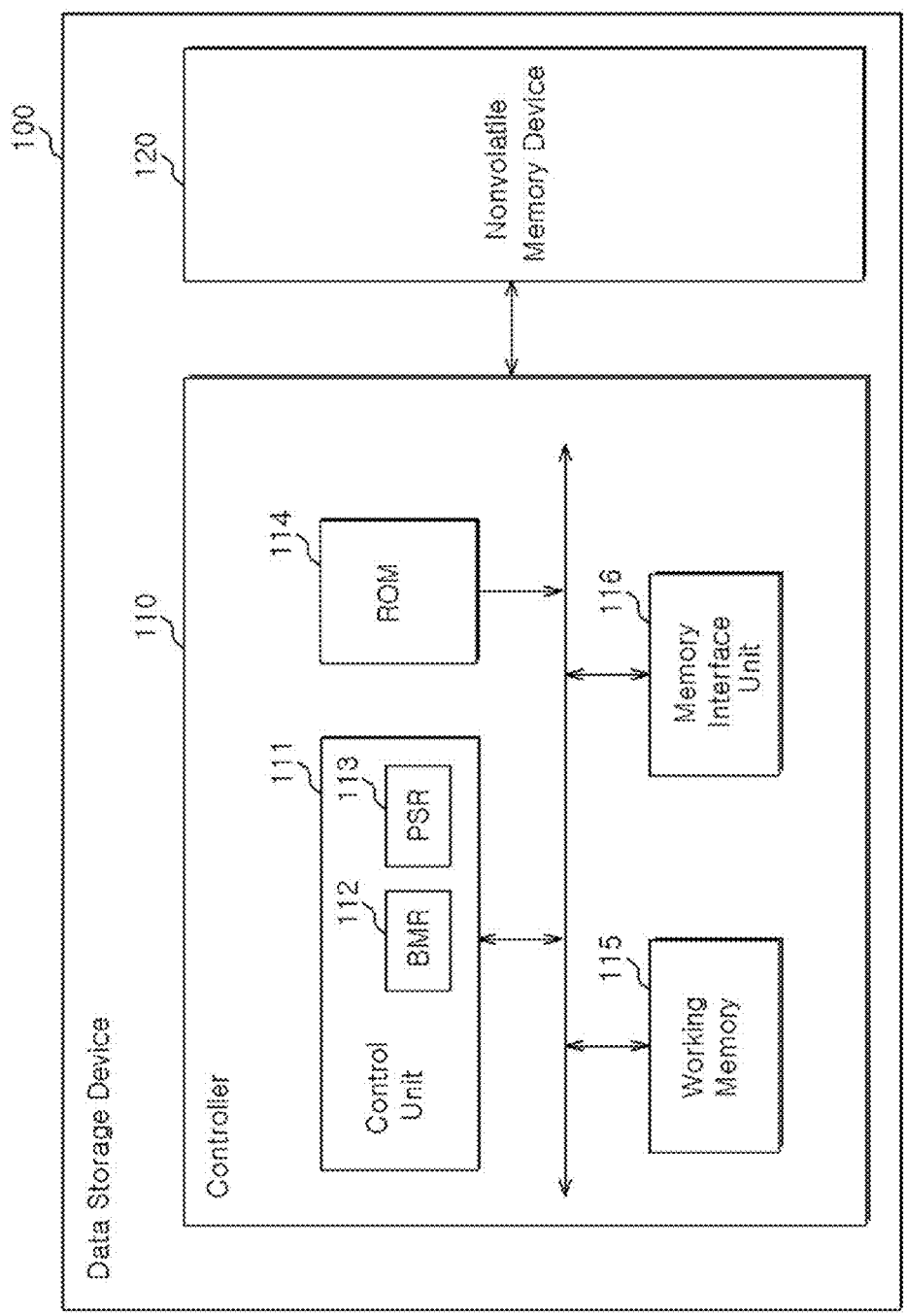
FIG. 1 is a block diagram illustrating a data storage device in accordance with an embodiment.

Embodiments may be better understood in conjunction with the drawings. However, the embodiments should not be construed limiting. Rather, these embodiments are exemplary.

It is to be understood herein that embodiments are not limited to the particulars shown in the drawings and that the drawings are not necessarily to scale and in some instances proportions may have been exaggerated in order to more clearly depict certain features. While particular terminology is used herein, it is to be appreciated that the terminology used herein is for the purpose of describing particular embodiments only and is not intended to limit the technical field of embodiments.

As used herein, the term "and/or" Includes any and all combinations of one or more of the associated listed items. It will be understood that when an element is referred to as being "on," "connected to," or "coupled to" another element, it may be directly on, connected to, or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, an operating method of a data storage device will be described below with reference to the accompanying drawings through various examples of embodiments.

FIG. 1 is a block diagram illustrating a data storage device in accordance with an embodiment. A data storage device 100 may store data to be accessed by a host device (not shown) such as a mobile phone, an MP3 player, a laptop computer, a desktop computer, a game player, a TV, an in-vehicle infotainment system, and so forth. The data storage device 100 may also be referred to as a memory system.

The data storage device 100 may vary according to the protocol of an interface which is electrically coupled with the host device. For example, the data storage device 100 may include: a solid state drive; a multimedia card in the form of an MMC, an eMMC, an RS-MMC, and a micro-MMC; a secure digital card in the form of an SD, a mini-SD, and a micro-SD; a universal serial bus (USB) storage device; a universal flash storage (UFS) device; a personal computer memory card international association (PCMCIA) card type storage device; a peripheral component interconnection (PCI) card type storage device; a PCI express (PCI-E) card type storage device; a compact flash (CF) card; a smart media card; a memory stick; and so forth.

The data storage device 100 may be in the form of package such as a package-on-package (POP), a system-in-package (SIP), a system-on-chip (SOC), a multi-chip package (MCP), a chip-on-board (COB), a wafer-level fabricated package (WFP), and a wafer-level stack package (WSP).

The data storage device 100 may include a nonvolatile memory device 120. The nonvolatile memory device 120 may serve as the storage medium of the data storage device 100. The nonvolatile memory device 120 may include a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PRAM) using a chalcogenide alloy, a resistive random access memory (RE-RAM) using a transition metal oxide, or a combination thereof. For example, the nonvolatile memory device 120 may be a combination of a NAND flash memory device and one or more of the various types of nonvolatile memory devices described above.

The data storage device 100 may include a controller 110. The controller 110 may include a control unit 111, a read only memory (ROM) 114, a working memory 115, and a memory interface unit 116. The control unit 111 may include a boot mode register 112 and a power saving mode register 113.

The control unit 111 may control general operation of the controller 110. The control unit 111 may analyze and process a signal which is inputted from a host device. For example, the control unit 111 may decode and execute (or drive) an operation code loaded on the working memory 115. The operation code may be referred to as firmware or software. The control unit 111 may be hardware or a combination of hardware and software that is capable of executing the operation code.

The boot mode register 112 may be used to set a mode of a booting operation (hereinafter, referred to as the boot mode) which is to be performed by the control unit 111. The power saving mode register 113 may be used in setting the boot mode which is to be performed by the control unit 111. The control unit 111 may change the boot mode based on the data stored in the boot mode register 112 and the power saving mode register 113. The booting operation of the control unit 111, which refers to the data stored in the boot mode register 112 and the power saving mode register 113, will be described below in detail.

The ROM 114 may store a main boot code. If power is supplied to the data storage device 100, the control unit 111 may read the main boot code stored in the ROM 114, and may perform the booting operation, based on the main boot code.

The working memory 115 may be used as a working space of the control unit 111. The working memory 115 may store the operation code, which will be executed by the control unit 111, and data necessary for execution of the operation code. The working memory 115 can have random access to memory cells. For instance, the working memory 115 may be a volatile random access memory such as a static random access memory (SRAM) and a dynamic random access memory (DRAM). For another example, the working memory 115 may be a nonvolatile random access memory such as a ferroelectric random access memory (FRAM), a magnetic random access memory (MRAM), a phase change random access memory (PRAM), and a resistive random access memory (RERAM).

The memory interface unit 116 may provide a control signal (for example, a command, an address, or an operation control signal) to the nonvolatile memory device 120 under the control of the control unit 111. Further, the memory interface unit 116 may exchange data with the nonvolatile memory device 120.

Figure 2:
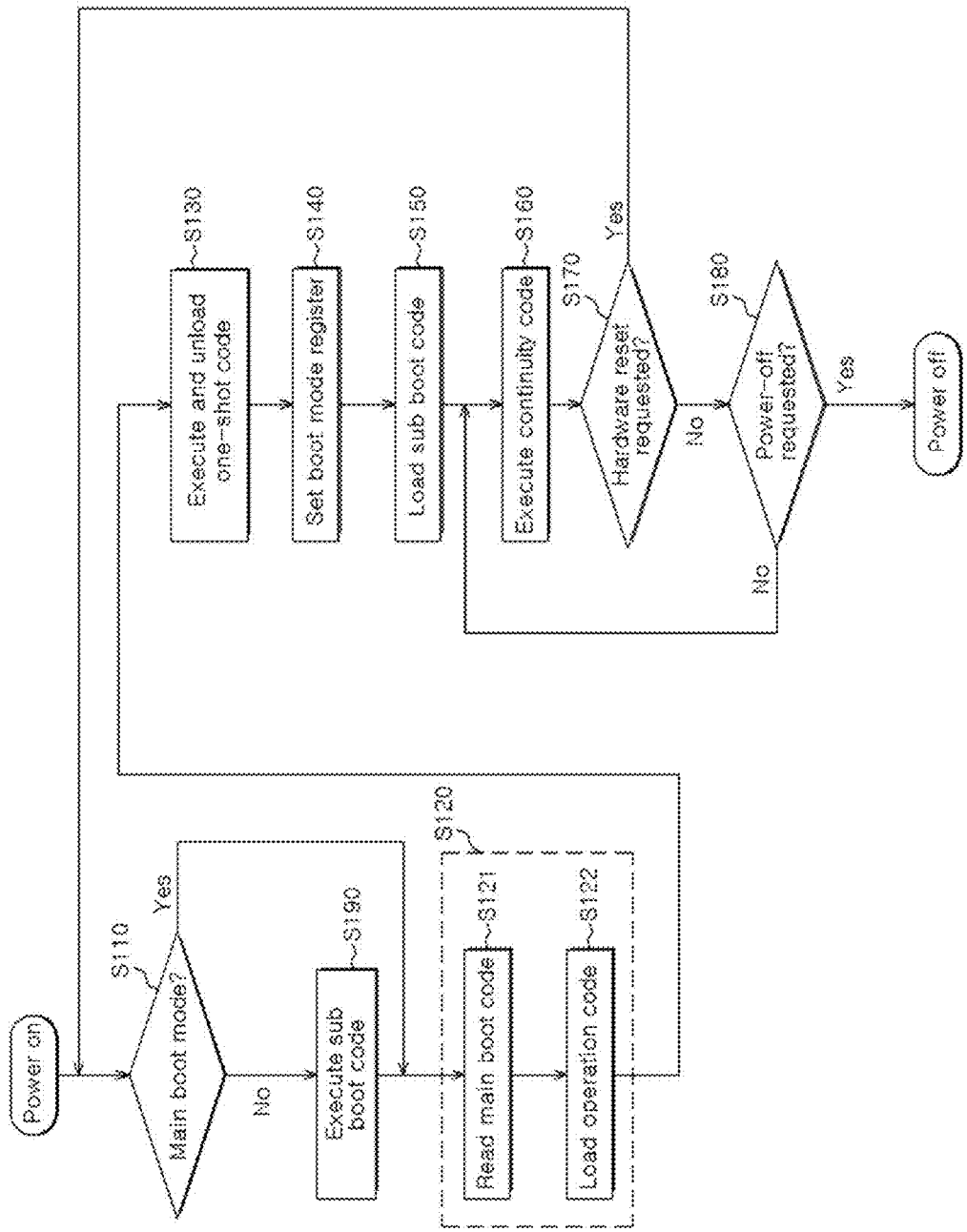
FIG. 2 is a flow chart showing operations of a data storage device in accordance with an embodiment.
Figure 3:
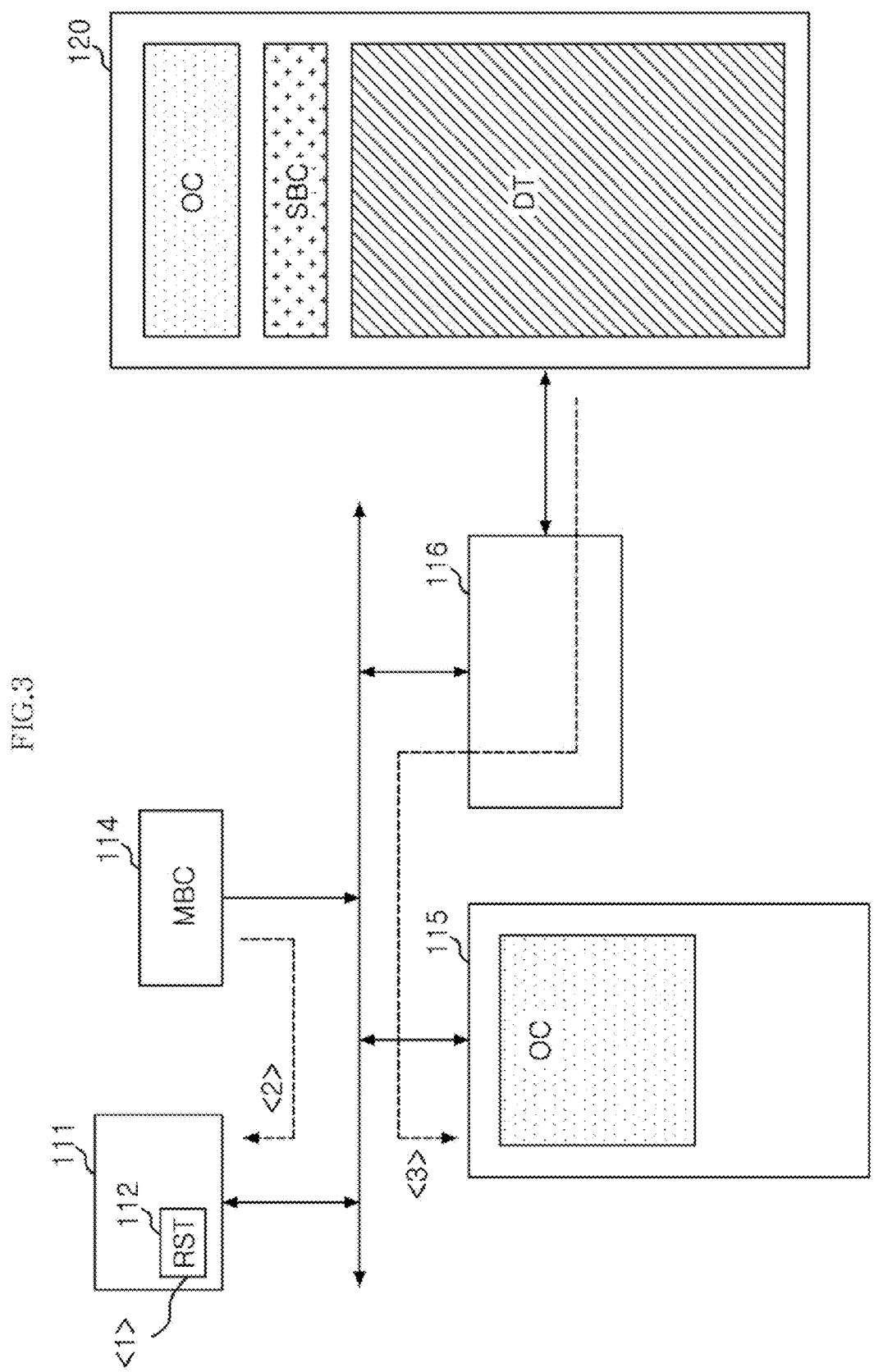
FIG. 3 is a diagram illustrating operation of a data storage device shown in FIG. 2.
Figure 4:
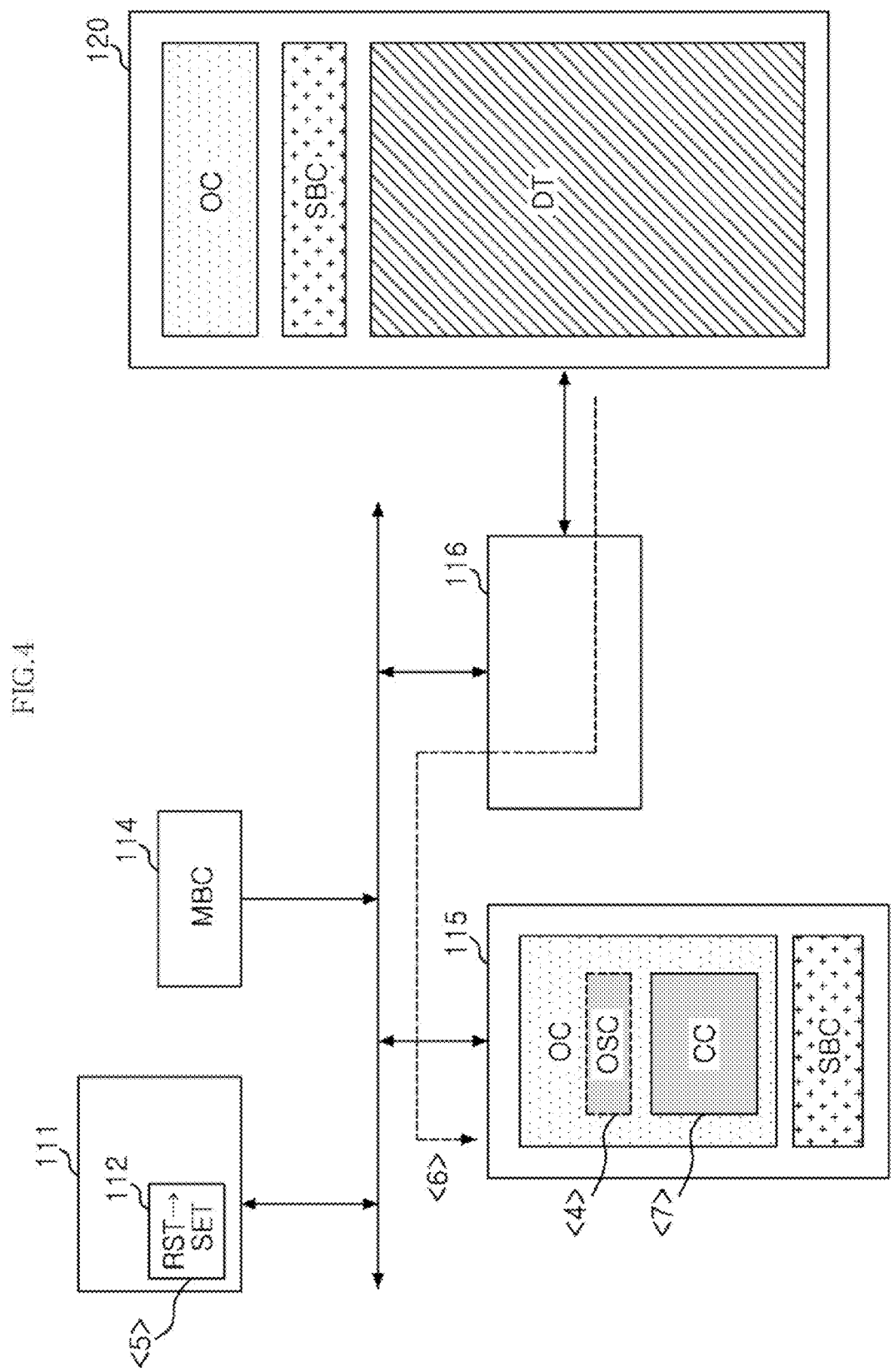
FIG. 4 is a diagram illustrating operation of an additional data storage device shown in FIG. 2.
Figure 5:
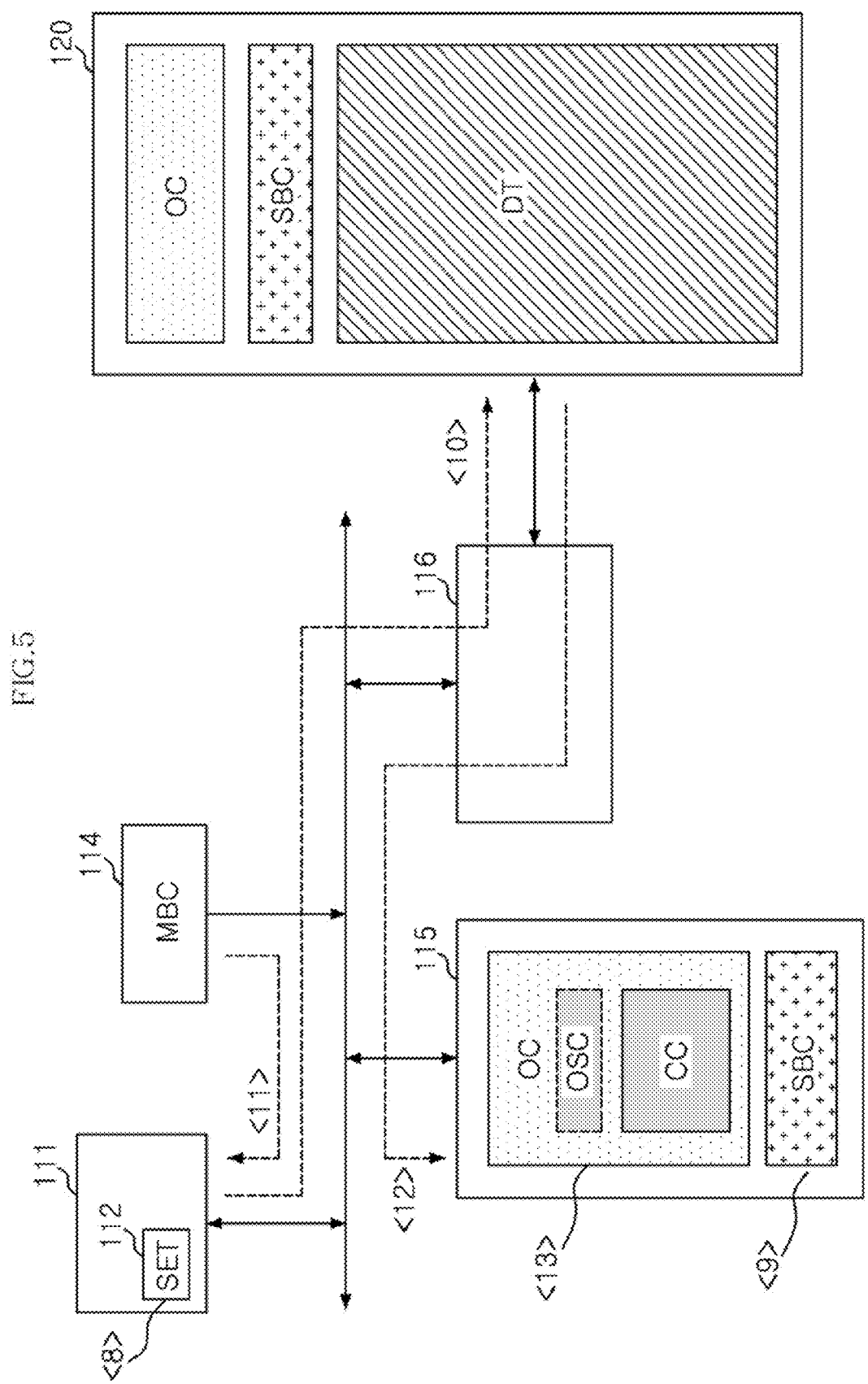
FIG. 5 is a further additional diagram illustrating operation of an additional data storage device shown in FIG. 2.

FIG. 2 is a flow chart illustrating operations of the data storage device in accordance with an embodiment. FIGS. 3 to 5 are diagrams illustrating the operations of the data storage device shown in FIG. 2. The operations shown in FIG. 2 may be better understood with reference to FIGS. 3 to 5. FIG. 2 illustrates a situation when a malfunction occurs while the data storage device 100 operates in a normal mode after a booting operation is completed, and then the data storage device 100 is reset due to the malfunction and performs the booting operation again.

In step S110, the control unit 111 may determine whether it is a main boot mode or not, based on the data stored in the boot mode register 112, when power is supplied to the data storage device (action <1> of FIG. 3). Since power is supplied, the boot mode register 112 may be in an initialized state. Once power is supplied, reset data may be stored in the boot mode register 112 immediately. The control unit 111 may determine that the main boot mode needs to be performed when the reset data is found in the boot mode register 112. In contrast, the control unit 111 may determine that the sub boot mode needs to be performed when the set data is found in the boot mode register 112. See the steps S170 and S190. How the set data can be stored in the boot mode register 112 will be explained later, e.g., in the step S140. In step 110, the boot mode register 112 stores the reset data. Thus, the control unit 111 determines that the main boot mode, rather than the sub boot mode, should be performed.

When the control unit 111 determines the main boot mode should be performed, the control unit 111 may execute a main boot code MBC (step S120). In step S121, the control unit 111 may read the main boot code MBC stored in the ROM 114 (action <2> of FIG. 3). In step S122, the control unit 111 may load an operation code OC stored in the nonvolatile memory device 120 on the working memory 115 through executing the main boot code MBC (action <3> of FIG. 3).

For instance, the main boot code MBC may include information on a position of the nonvolatile memory device 120 where the operation code OC is stored, information on the nonvolatile memory device 120 which is necessary to read the operation code OC from the nonvolatile memory device 120, an execution code for reading the operation code OC, and so forth.

In step S130, the control unit 111 may execute a one-shot operation code (hereinafter, referred to as the one-shot code) OSC, and may unload the executed one-shot code OSC from the working memory 115 (action <4> of FIG. 4).

For instance, the one-shot code OSC may include a code for initializing the internal function blocks of the controller 110, a code for solving problems which are likely to occur in an abnormal off state (for example, a sudden power-off state), and so forth. In this context, the one-shot code OSC may be a part of the operation code OC which is executed one time before the data storage device 100 enters the normal mode after the booting operation is completed. Therefore, the one-shot code OSC may be unloaded once it is been executed, for efficient use of the working memory 115.

In step S140, the control unit 111 may set the boot mode register 112 (action <5> of FIG. 4). The control unit 111 may store set data in the boot mode register 112 such that a subsequent booting operation, except a booting operation which is performed immediately after a power-on operation, may be performed in a sub boot mode.

In step S150, the control unit 111 may load a sub boot code SBC stored in the nonvolatile memory device 120 on the working memory 115 (action <6> of FIG. 4). The sub boot code SBC may be loaded on a specified region of the working memory 115 which is capable of retaining data until power is cut off.

For instance, the sub boot code SBC may include a code for initializing the nonvolatile memory device 120. The code for initializing the nonvolatile memory device 120 may include a code for initializing a bias condition to be used in an internal operation of the nonvolatile memory device 120.

As shown in FIG. 2, the step S130 of executing the one-shot code OSC, the step S140 of setting the boot mode register 112, and the step S150 of loading the sub boot code SBC are separately performed. However, it is to be noted that the step S140 of setting the boot mode register 112 and the step S150 of loading the sub boot code SBC may be included in the step S130 of executing the one-shot code OSC and may be performed while the step S130 of executing the one-shot code OSC is performed.

In step S160, the control unit 111 may execute a continuity operation code (hereinafter, referred to as the continuity code) CC (action <7> of FIG. 4). For instance, the continuity code CC may include a code for performing the booting operation of the data storage device 100. Also, the continuity code CC may include a code for processing a request from the host device. In this context, the continuity code CC is a part of the operation code OC which is continuously executed even when the data storage device 100 enters the normal mode after the booting operation is completed.

The control unit 111 may complete the booting operation and enter the normal mode through executing the continuity code CC. While operating in the normal mode the control unit 111 may process a request from the host device. For example, the control unit 111 may store user data DT provided from the host device in the nonvolatile memory device 120, or may read user data DT from the nonvolatile memory device 120 and provide the user data DT to the host device. Moreover, while operating in the normal mode, the control unit 111 may perform an internal operation for managing the data storage device 100.

For various reasons, the host device may initialize, that is, reset, the data storage device 100. The host device may request a reset by manipulating software. If the reset request made by software manipulation fails (e.g. the reset request does not performed or is abnormally performed), the host device may request a reset by hardware manipulation so that the data storage device 100 is immediately reset or is normally reset. The host device may request a hardware reset by providing a hardware reset signal through a signal line electrically coupled with the data storage device 100.

In step S170, the control unit 111 may determine whether or not the hardware reset is requested from the host device. When the hardware reset is not requested, the control unit 111 may operate in the normal mode until a power-off is requested in step S180, through continuous execution of the continuity code CC. When the hardware reset is requested, the control unit 111 may perform the booting operation again.

If the booting operation is performed again by the hardware reset request, the process may proceed to the step S110. In the step S110, the control unit 111 may determine which boot mode should be performed (the main boot mode or the sub boot mode) based on the type of data stored in the boot mode register 112 (action <8> of FIG. 5). For example, when the set data is found in the boot mode register 112, the control unit 111 may determine that the sub boot mode should be performed. In contrast, when the reset data is found in the boot mode register 112, the control unit 111 may determine that the main boot mode should be performed. Here, because the step S140 is already performed, the boot mode register 112 stores the set data, rather than the reset data. Thus, the control unit 111 may determine that the sub boot mode should be performed because the set data, rather than the reset data, are stored (or found) in the boot mode register 112. The control unit 111 may perform in the step S190.

In the step S190, the control unit 111 may execute the sub boot code SBC loaded on the working memory 115 (action <9> of FIG. 5). As described above, the sub boot code SBC may include the code for initializing the nonvolatile memory device 120. Accordingly, the control unit 111 may initialize the nonvolatile memory device 120 through executing the sub boot code SBC (action <10> of FIG. 5).

As the sub boot code SBC is executed prior to the main boot code MBC upon the hardware reset request, a situation can be prevented in which the main boot code MBC is not normally read from the nonvolatile memory device 120 due to a malfunction of the data storage device 100. The main boot code MBC performs main booting operations. Unlike the main boot code MBC, the sub boot code SBC contributes to normally loading the main boot code MBC, rather than directly executing the main booting operation. Thus, the sub boot code SBC performs a different function from the main boot code MBC. Accordingly, the sub boot code SBC may be a separate code, rather than part of the main boot code MBC.

After the sub boot code SBC is executed, the step S121 through the step S180 may be performed sequentially as described above. Namely, the control unit 111 may read the main boot code MBC stored in the ROM 114 (action <11> of FIG. 5), load again the operation code OC on the working memory 115 (action <12> of FIG. 5), and execute the operation code OC which is loaded again (action <13> of FIG. 5). The operation in which the operation code OC is loaded on the working memory 115 again may be called an update or overwrite operation.

Figure 6:
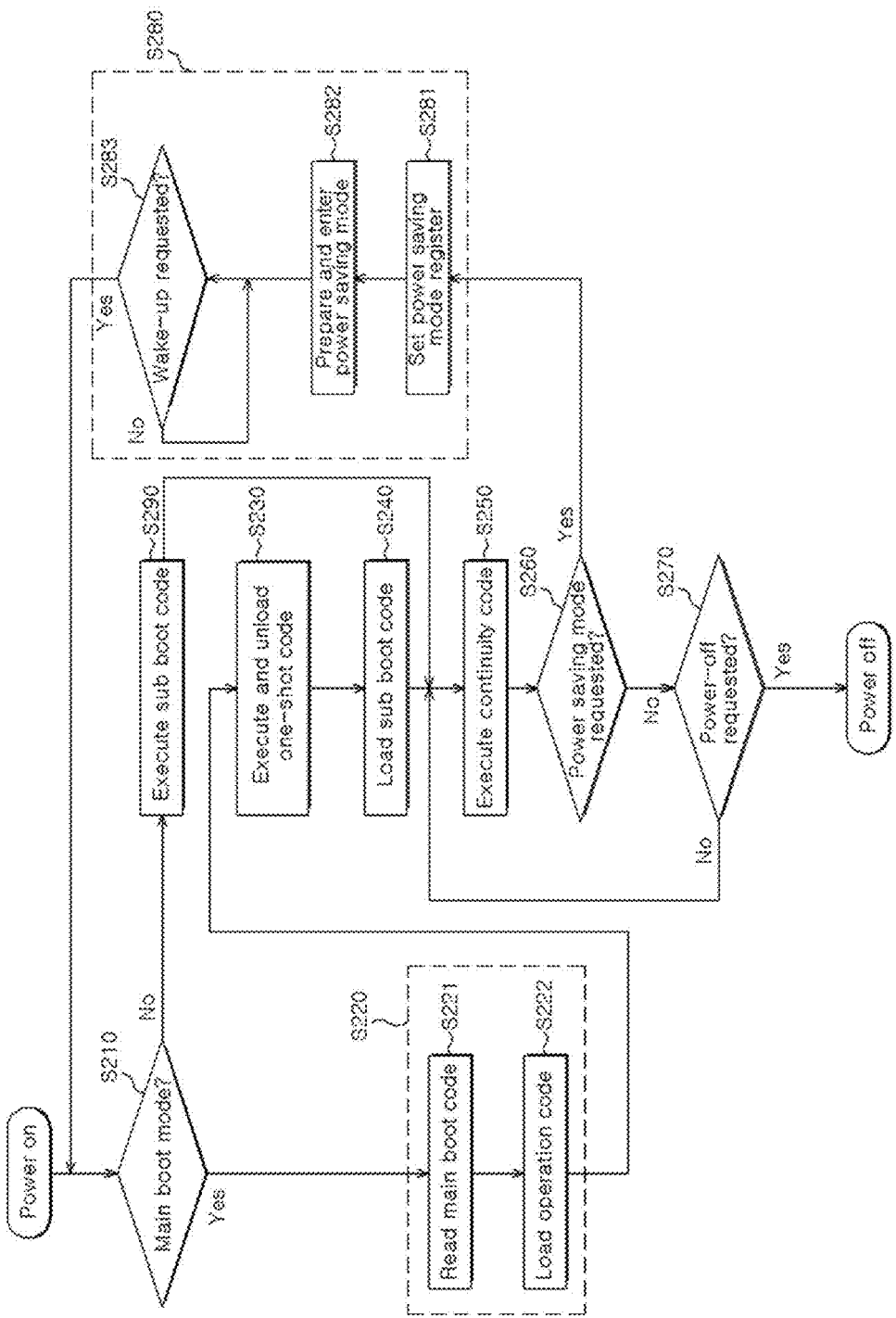
FIG. 6 is a flow chart illustrating operations of a data storage device in accordance with an embodiment.

FIG. 6 is a flow chart illustrating operations of a data storage device in accordance with an embodiment. FIGS. 7 to 10 are diagrams illustrating operations of the data storage device shown in FIG. 6. FIG. 6 can be better understood with reference to FIGS. 7 to 10. The data storage device 100 shown in FIG. 6 already completed a power-on booting operation, operated in a normal mode, and then stays in a power saving mode. At this point the data storage device 100 is about to wake up from the power saving mode to return to the normal mode. To return to the normal mode, the booting operation needs to be performed first.

Figure 7:
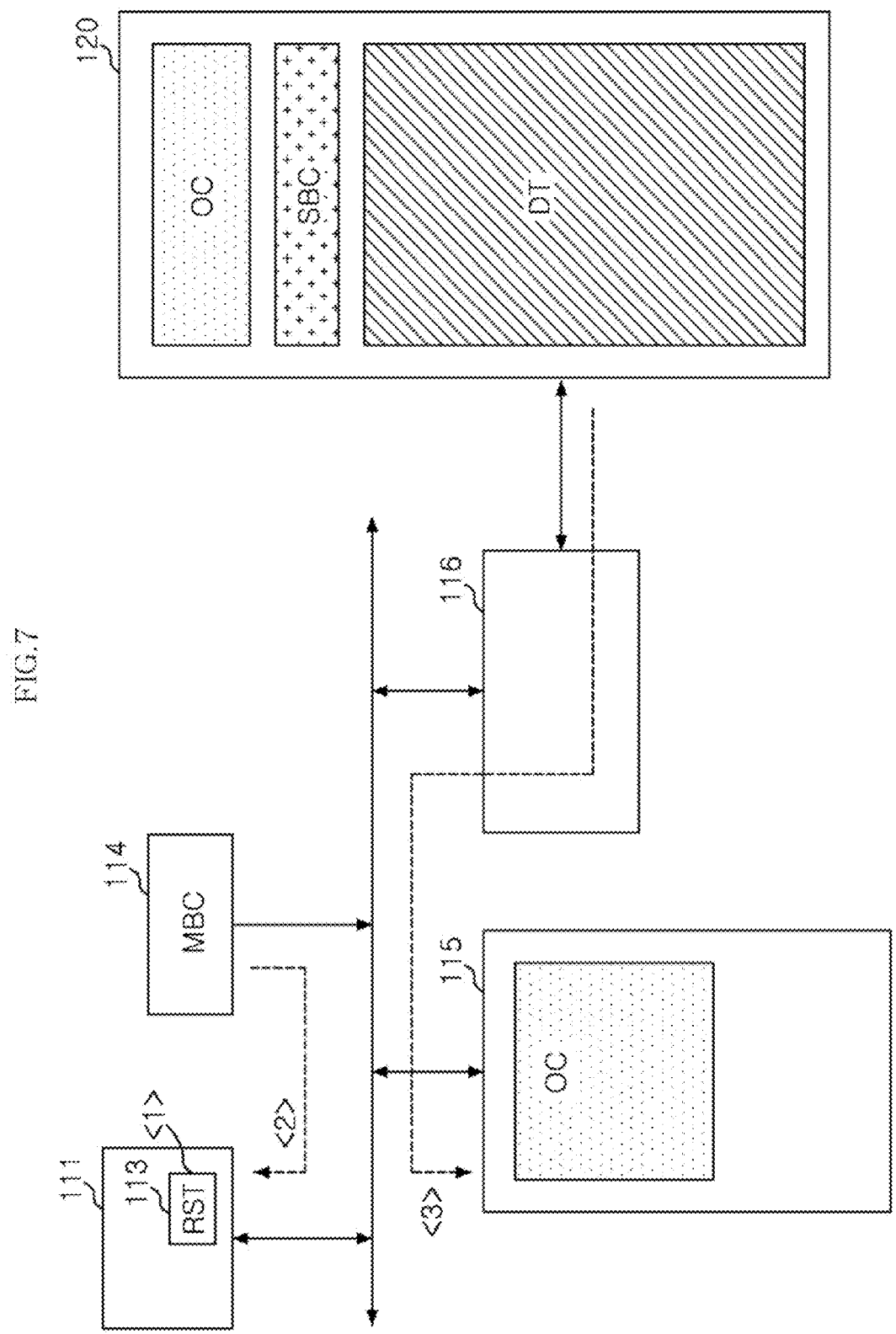
FIG. 7 is a diagram illustrating operations of the data storage device shown in FIG. 6.

In step S210, the control unit 111 may determine which boot mode (a main boot mode or a sub boot mode) should be performed to return to the normal mode by examining what kind of data is stored in the power saving mode register 113 (action <1> of FIG. 7). To rephrase, the control unit 111 needs to determine whether the main boot mode should be performed or the sub boot mode should be performed to return to the normal mode from the power saving mode. The determination is made in reference to the data found in the power saving mode register 113. For example, when reset data is found in the power saving mode register 113, the main boot mode is performed to return to the normal mode. In contrast, when set data is found in the power saving mode register 113, the sub boot mode is performed to return to the normal mode. The reset data may be stored in the power saving mode register 113 shortly after power turns on and is supplied to the data storage device 100. The set data may be stored (or replaced with the reset data) in the power saving mode register 113 after the main boot mode has been completed. See the step S140 of FIG. 2.

When the control unit 111 determines that the main boot mode should be performed, the steps S220 through S250, which are similar to S120 through S160 of FIG. 2, are performed. Specifically, the control unit 111 may perform the action of executing a main boot code MBC (step S220). In step S221, the control unit 111 may read the main boot code MBC stored in the ROM 114 (action <2> of FIG. 7). In step S222, the control unit 111 may load an operation code OC, which is stored in the nonvolatile memory device 120 on the working memory 115 through executing the main boot code MBC (action <3> of FIG. 7).

For instance, the main boot code MBC may include information on the location of the nonvolatile memory device 120 where the operation code OC is stored, information necessary to read the operation code OC from the nonvolatile memory device 120, and so forth.

In step S230, the control unit 111 may execute a one-shot operation code (hereinafter, referred to as the one-shot code) OSC, and may unload the executed one-shot code OSC from the working memory 115 (action <4> of FIG. 8).

For instance, the one-shot code OSC may include a code for initializing the internal function blocks of the controller 110, a code for solving problems which are likely to occur when a mode change is made from an abnormal off state (for example, a sudden power-off state), and so forth. In this context, the one-shot code OSC may be a part of the operation code OC which is executed one time between the booting operation and the normal mode. Therefore, the one-shot code OSC may be unloaded after being executed for efficient use of the working memory 115.

Figure 8:
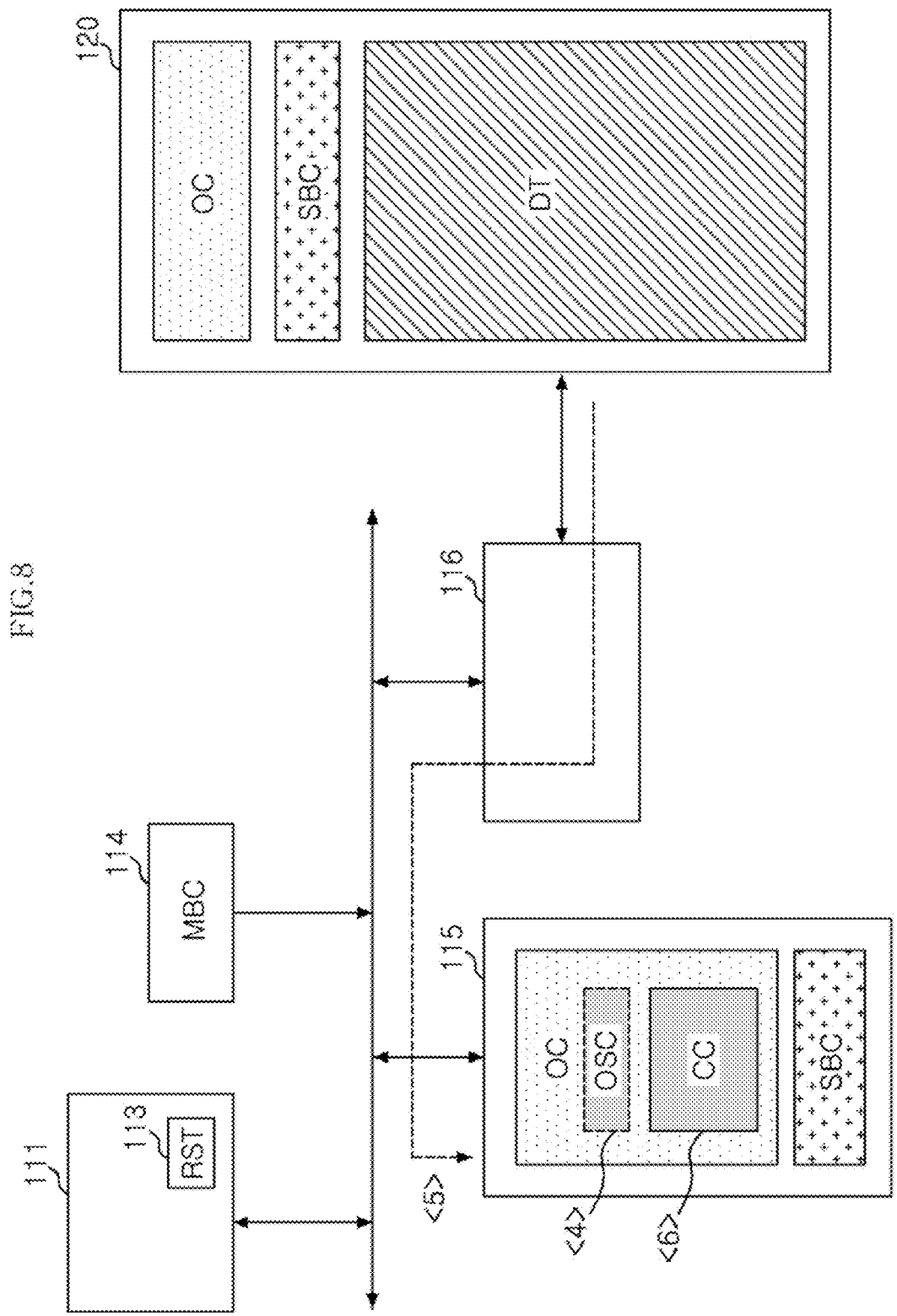
FIG. 8 is an additional diagram illustrating operations of the data storage device shown in FIG. 6.

In step S240, the control unit 111 may load a sub boot code SBC, which is stored in the nonvolatile memory device 120, on the working memory 115 (action <5> of FIG. 8). The sub boot code SBC may be loaded on a specified region of the working memory 115 which is capable of retaining data until power is cut off.

For instance, the sub boot code SBC may include information on the locations of the nonvolatile memory device 120 where a continuity code CC of the operation code OC is stored and an execution code for reading the continuity code CC.

In FIG. 6, the step S230 of executing the one-shot code OSC and the step S240 of loading the sub boot code SBC are separately performed. However, it is to be noted that the step S240 of loading the sub boot code SBC may be included in the step S230 of executing the one-shot code OSC and may be performed at substantially the same time when the step S230 of executing the one-shot code OSC is performed.

In step S250, the control unit 111 may execute the continuity code CC (action <6> of FIG. 8). For instance, the continuity code CC may include a code for performing the booting operation of the data storage device 100. Also, the continuity code CC may include a code for processing a request from the host device.

The control unit 111 may complete the booting operation and then enter the normal mode through executing the continuity code CC. While operating in the normal mode, the control unit 111 may process a request from the host device. For example, the control unit 111 may store user data DT, which is provided from the host device, in the nonvolatile memory device 120, or may provide user data DT, which is read from the nonvolatile memory device 120, to the host device. Moreover, while operating in the normal mode, the control unit 111 may perform an internal operation for managing the data storage device 100.

In order to reduce power consumption, the host device may cause the data storage device 100 to enter the power saving mode. The host device may request a mode change to the power saving mode by way of software manipulation or hardware manipulation.

In step S260, the control unit 111 may determine whether the power saving mode is requested from the host device. When the power saving mode is not requested, the control unit 111 may keep operating in the normal mode until a power-off is requested in step S270 through continuous execution of the continuity code CC. However, when the power saving mode is requested, the control unit 111 may change the mode and operate in the power saving mode (step S280).

Figure 9:
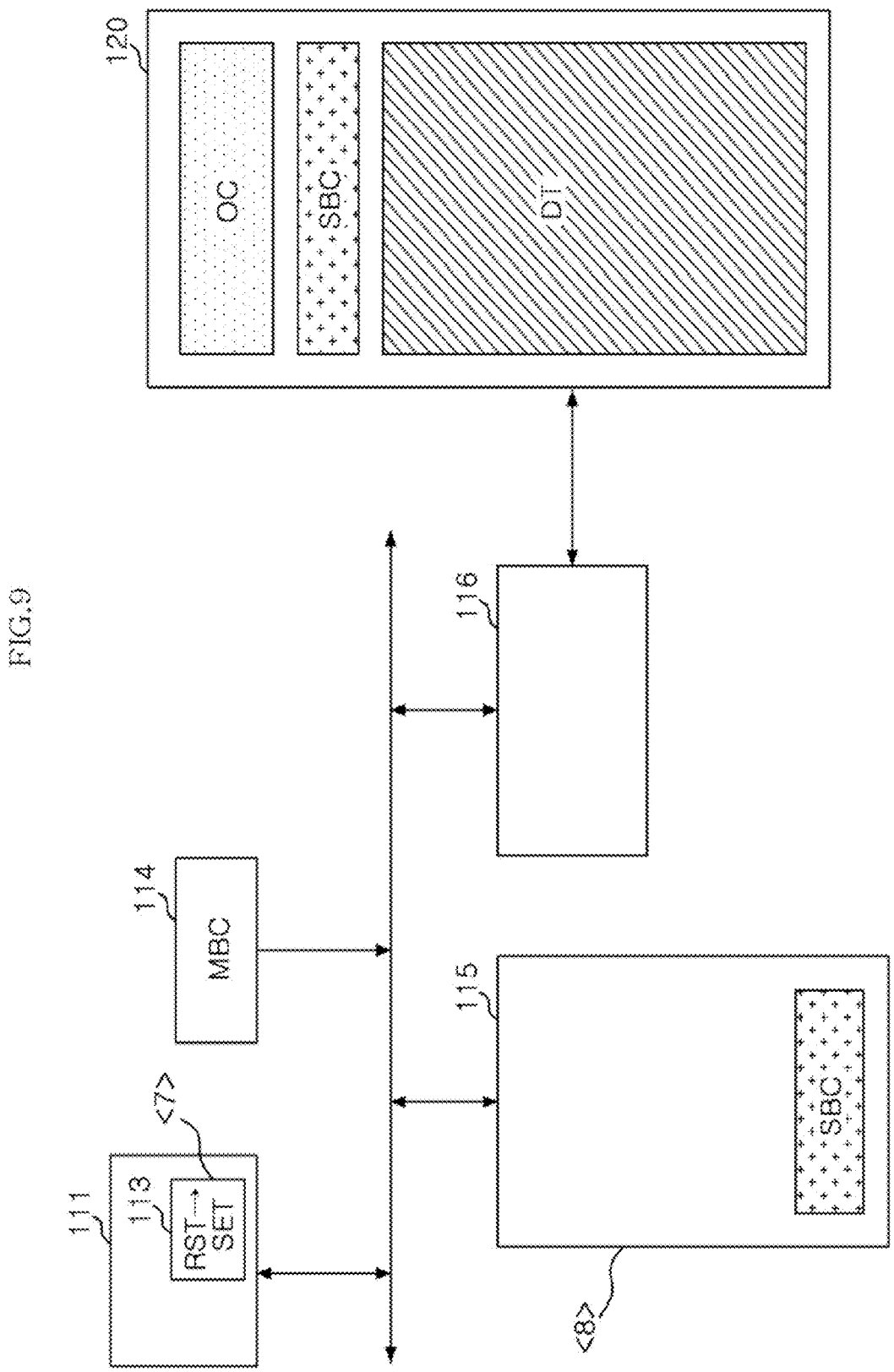
FIG. 9 is a further additional diagram illustrating operations of the data storage device shown in FIG. 6.

Specifically, in step S281, the control unit 111 may set the power saving mode register 113 (action <7> of FIG. 9). That is to say, the control unit 111 may store set data in the power saving mode register 113 such that a subsequent booting operation (for example, a booting operation performed to wake up from the power saving mode and return to the normal mode) may be performed in a sub boot mode.

In step S282, the control unit 111 may perform preparation work for entry to the power saving mode and may then enter the power saving mode. For instance, the control unit 111 may end all works which are being performed. Further, the control unit 111 may back up the various data, which are stored in the working memory 115, to the nonvolatile memory device 120, and may cut off the power supplied to the internal function blocks including the working memory 115 and the nonvolatile memory device 120. However, power supply to a specified region where the sub boot code SBC is stored may be maintained. Thus, the sub boot code SBC may be retained in the working memory 115 (action <8> of FIG. 9).

In step S283, the control unit 111 may determine whether a wake-up is requested from the host device. When the wake-up is not requested, the control unit 111 may keep operating in the power saving mode until the wake-up is requested. When the wake-up is requested, the control unit 111 may perform the booting operation again.

If the booting operation is performed again upon the wake-up request, the process may proceed to the step S210. In the step S210, the control unit 111 may determine which boot mode (the main boot mode or the sub boot mode) should be performed, based on the data stored in the power saving mode register 113 (action <9> of FIG. 10). Because the step S281 was already performed, the set data may be stored in the power saving mode register 113. The control unit 111 may determine that the sub boot mode should be performed because the set data are found in the power saving mode register 113 and may proceed to step S290.

Figure 10:
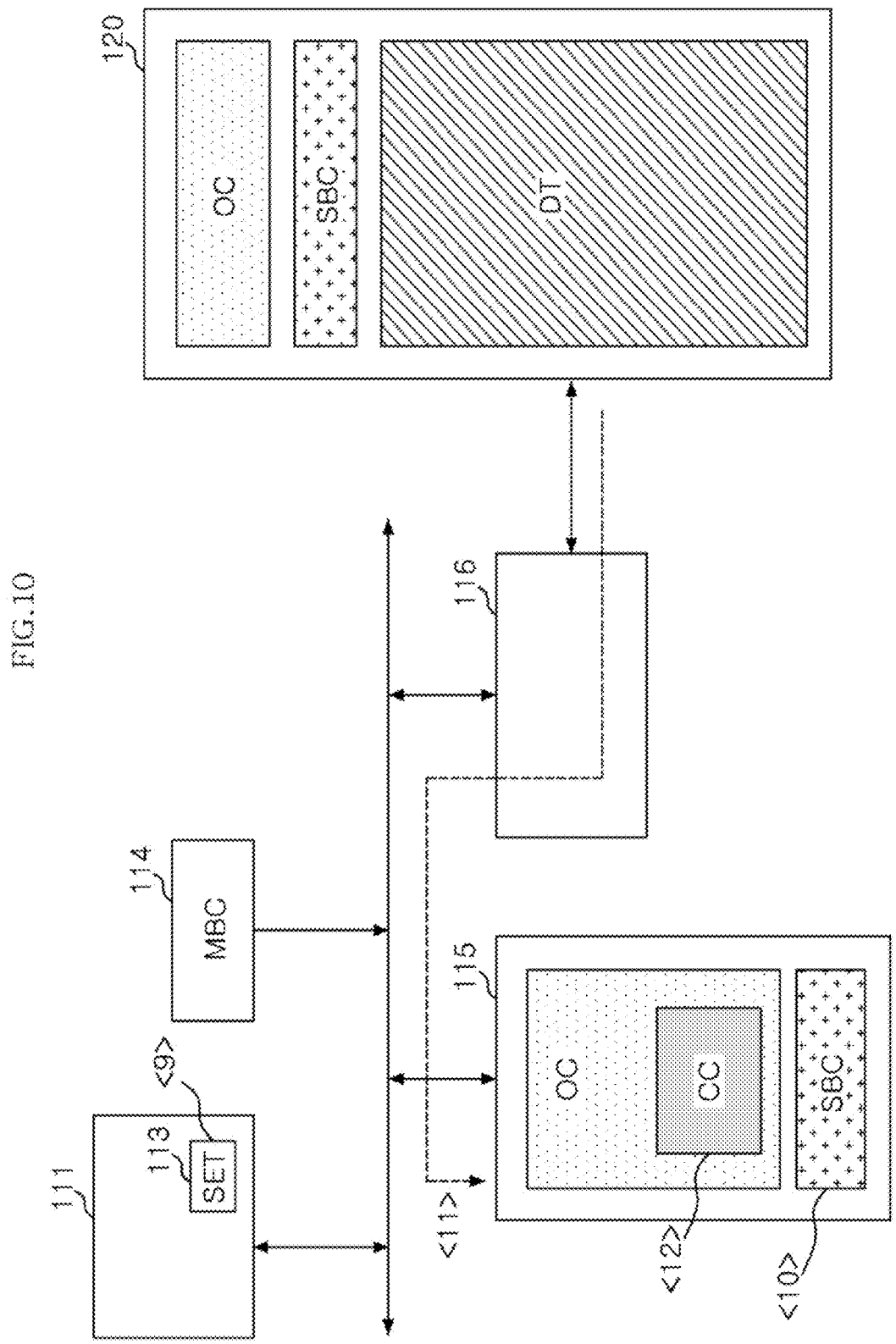
FIG. 10 is an even further diagram illustrating operations of the data storage device shown in FIG. 6.

In the step S290, the control unit 111 may execute the sub boot code SBC loaded on the working memory 115 (action <10> of FIG. 10). As described above, the sub boot code SBC may include the execution code for reading the continuity code CC. Accordingly, the control unit 111 may load only the continuity code CC, which is stored in the nonvolatile memory device 120, on the working memory 115 through executing the sub boot code SBC (action <11> of FIG. 10).

As the sub boot code SBC is executed instead of the main boot code MBC when the booting operation is performed again upon the wake-up request, only the continuity code CC may be loaded and the loaded continuity code CC may be immediately executed, whereby the booting operation of the data storage device 100 may be quickly performed.

After the sub boot code SBC is executed, the normal mode process including the step S250 may be repeated as described above. In other words, the control unit 111 may wake up from the power saving mode and return to the normal mode through executing the continuity code CC (action <12> of FIG. 10).

Figure 11:
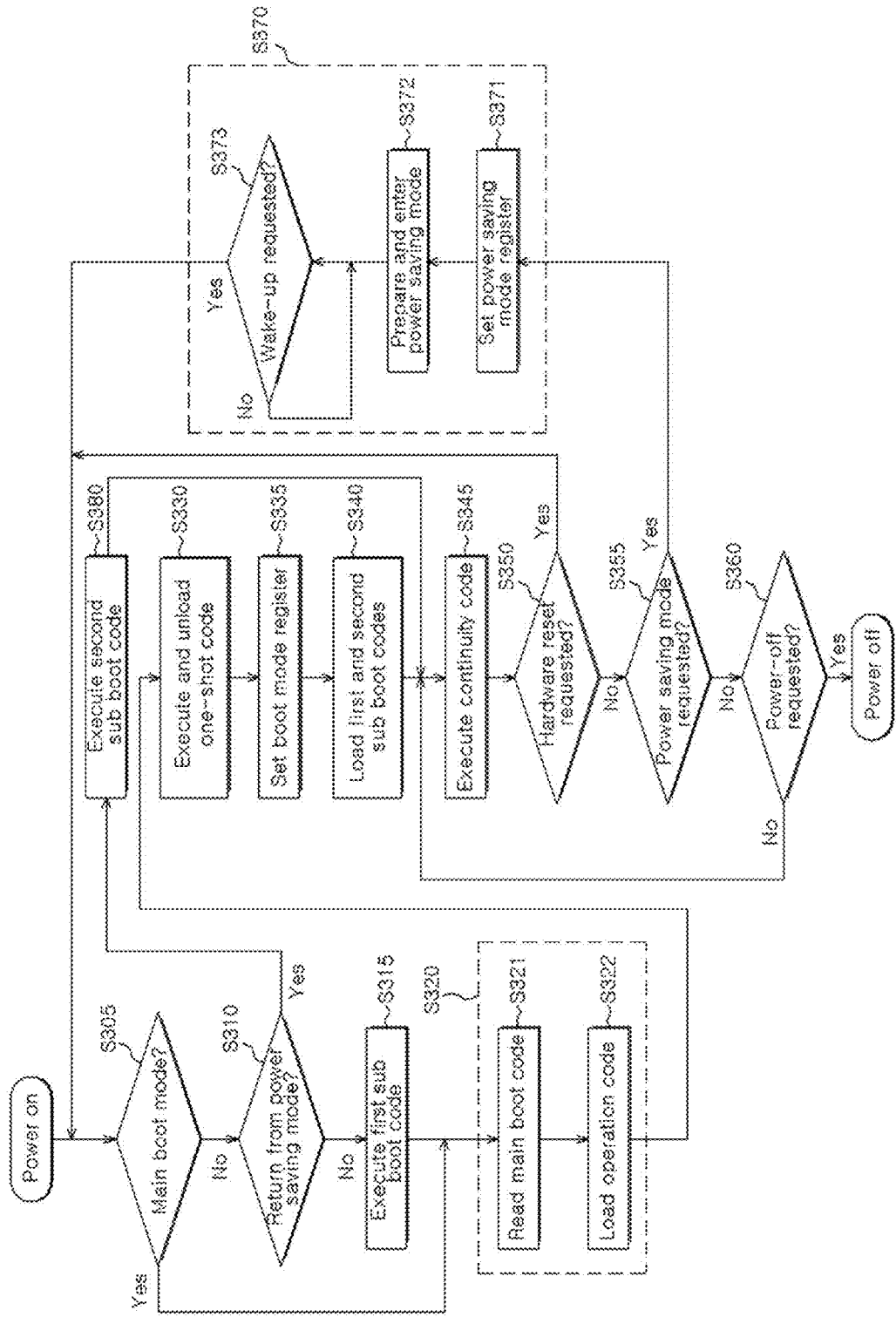
FIG. 11 is a flow chart illustrating operations of a data storage device in accordance with an embodiment.

FIG. 11 is a flow chart illustrating operations of a data storage device in accordance with an embodiment. FIGS. 12 to 16 are diagrams illustrating the operations of the data storage device shown in FIG. 11. FIG. 11 may be better understood with reference to FIGS. 12 to 16. FIG. 11 shows operation of the data storage device when a malfunction occurs while the data storage device 100 operates in a normal mode after a booting operation is completed. The data storage device 100 may be reset due to the malfunction and perform the booting operation again. Or, the data storage device 100 may enter a power saving mode while it operates in the normal mode, and then wake up from the power saving mode and perform the booting operation again to return to the normal mode.

Figure 12:
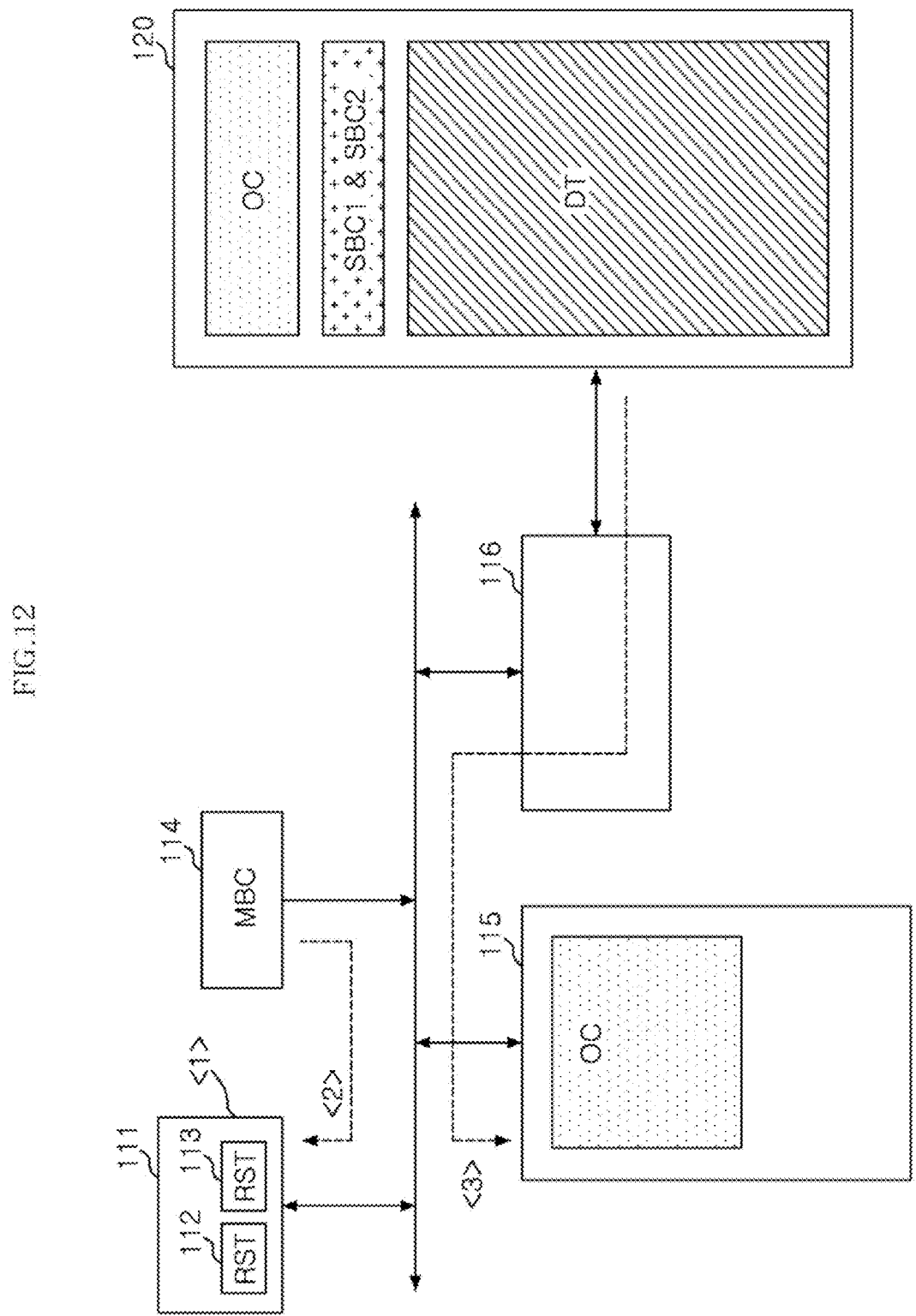
FIG. 12 is a diagram illustrating operations of the data storage device shown in FIG. 11.

In step S305, the control unit 111 may determine which boot mode (a main boot mode or a sub boot mode) should be performed based on the data stored in the boot mode register 112, when power is supplied (action <1> of FIG. 12). Since power has just been supplied, the boot mode register 112 may be in an initialized state. That is to say, immediately after power is supplied, reset data may be stored in the boot mode register 112. Thus, the control unit 111 may determine that the main boot mode should be performed.

When the control unit 111 determines that it is in the main boot mode, the control unit 111 may perform the action of executing a main boot code MBC (step S320). In step S321, the control unit 111 may read the main boot code MBC stored in the ROM 114 (action <2> of FIG. 12). In step S322, the control unit 111 may load an operation code OC, which is stored in the nonvolatile memory device 120, on the working memory 115 through executing the main boot code MBC (action <3> of FIG. 12).

For instance, the main boot code MBC may include information on the location of the nonvolatile memory device 120 where the operation code OC is stored, information of the nonvolatile memory device 120 which is necessary to read the operation code OC from the nonvolatile memory device 120, an execution code for reading the operation code OC, and so forth.

Figure 13:
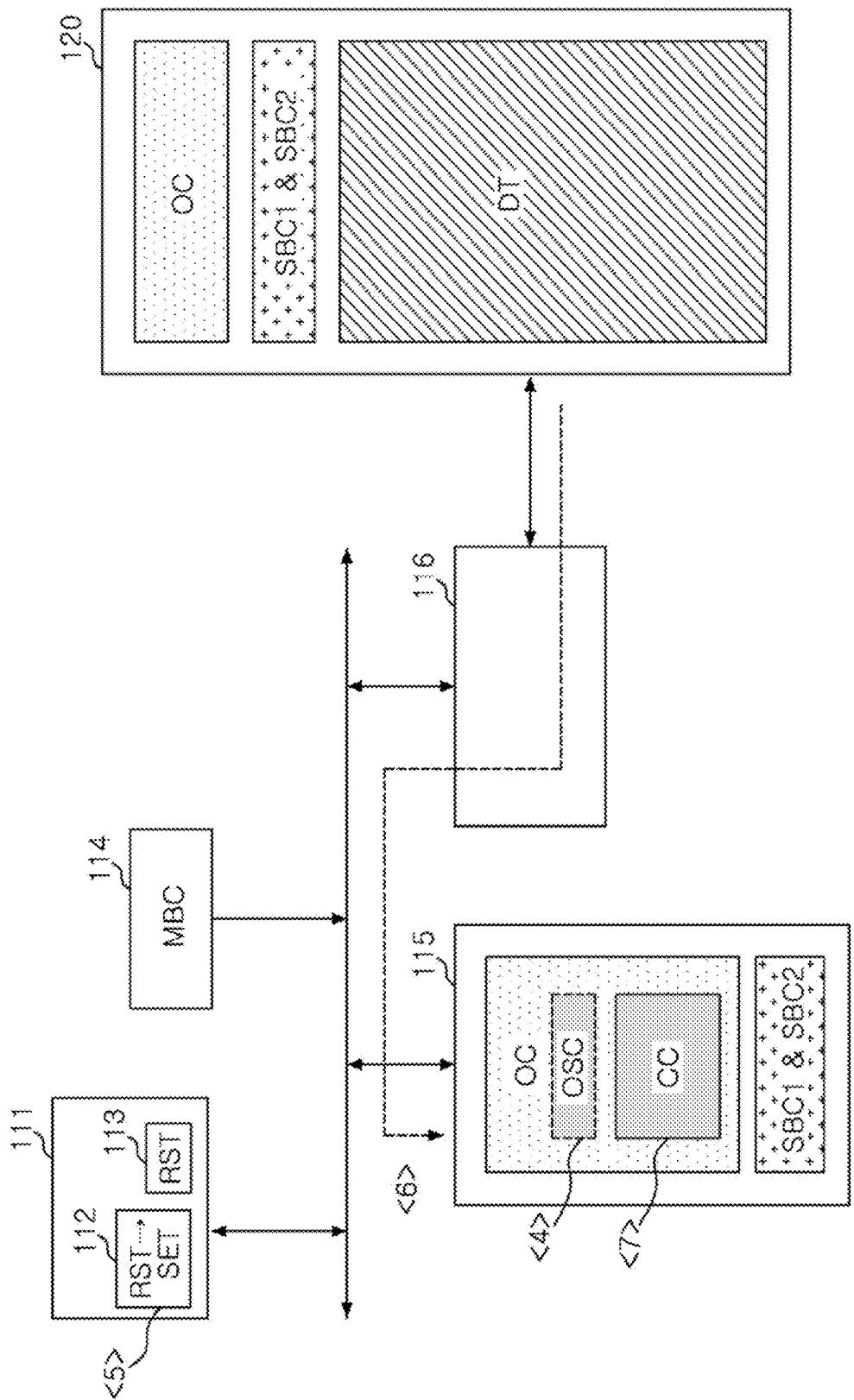
FIG. 13 is an additional diagram illustrating operations of the data storage device shown in FIG. 11.

In step S330, the control unit 111 may execute a one-shot code OSC of the operation code OC, and may unload the executed one-shot code OSC from the working memory 115 (action <4> of FIG. 13).

For instance, the one-shot code OSC may include a code for initializing the internal function blocks of the controller 110, a code for solving problems which are likely to occur when the mode returns from an abnormal off state (for example, a sudden power-off state), and so forth. In this context, the one-shot code OSC is a part of the operation code OC which is executed one time before the data storage device 100 enters the normal mode after the booting operation is completed. Therefore, the one-shot code OSC may be unloaded after being executed for efficient use of the working memory 115.

In step S335, the control unit 111 may set the boot mode register 112 (action <5> of FIG. 13). That is to say, the control unit 111 may store set data in the boot mode register 112 such that a subsequent booting operation (except a booting operation by a power-on operation) may be performed in a sub boot mode.

In step S340, the control unit 111 may load a first sub boot code SBC1 and a second sub boot code SBC2, which are stored in the nonvolatile memory device 120, on the working memory 115 (action <6> of FIG. 13). The first sub boot code SBC1 and the second sub boot code SBC2 may be loaded on a specified region of the working memory 115 which is capable of retaining data until power is cut off.

For instance, the first sub boot code SBC1 may include a code for initializing the nonvolatile memory device 120. The code for initializing the nonvolatile memory device 120 may include a code for initializing a bias condition to be used in an internal operation of the nonvolatile memory device 120. The second sub boot code SBC2 may include the information on the location of the nonvolatile memory device 120 where a continuity code CC of the operation code OC is stored, an execution code for reading the continuity code CC, etc.

Referring to FIG. 11, the step S330 of executing the one-shot code OSC, the step S335 of setting the boot mode register 112, and the step S340 of loading the first and second sub boot codes SBC1 and SBC2 are separately performed. However, it is to be noted that the step S335 of setting the boot mode register 112 and the step S340 of loading the first and second sub boot codes SBC1 and SBC2 may be combined with the step S330 of executing the one-shot code OSC and may be performed while the step S330 of executing the one-shot code OSC is performed.

In step S345, the control unit 111 may execute the continuity code CC of the operation code OC (action <7> of FIG. 13). For instance, the continuity code CC may include a code for performing the booting operation of the data storage device 100. Also, the continuity code CC may include a code for processing a request from the host device.

The control unit 111 may complete the booting operation and enter the normal mode through executing the continuity code CC. While operating in the normal mode, the control unit 111 may process a request from the host device. For example, the control unit 111 may store user data DT, which is provided from the host device, in the nonvolatile memory device 120, or may provide user data DT, which is read from the nonvolatile memory device 120, to the host device. Moreover, while operating in the normal mode, the control unit 111 may perform an internal operation for managing the data storage device 100.

For various reasons, the host device may initialize (that is, reset) the data storage device 100. The host device may request a reset by way of software manipulation. If the reset request made by way of software manipulation is not performed or is abnormally performed, the host device may request a reset by way of hardware manipulation such that the data storage device 100 is immediately reset or is normally reset. The host device may request the hardware reset by providing a hardware reset signal through a signal line electrically coupled with the data storage device 100.

In step S350, the control unit 111 may determine whether the hardware reset is requested from the host device. The operation of the control unit 111 may be changed according to whether the hardware reset is requested.

If the booting operation is performed again by the hardware reset request, the process may proceed back to the step S305. In the step S305, the control unit 111 may determine which boot mode (the main boot mode or the sub boot mode) should be performed based on the data stored in the boot mode register 112 (action <8> of FIG. 14). Because the step S335 was already performed, the set data may be stored in the boot mode register 112. The control unit 111 may determine that the sub boot mode should be performed because the set data are found in the boot mode register 112, and may perform step S310.

Figure 14:
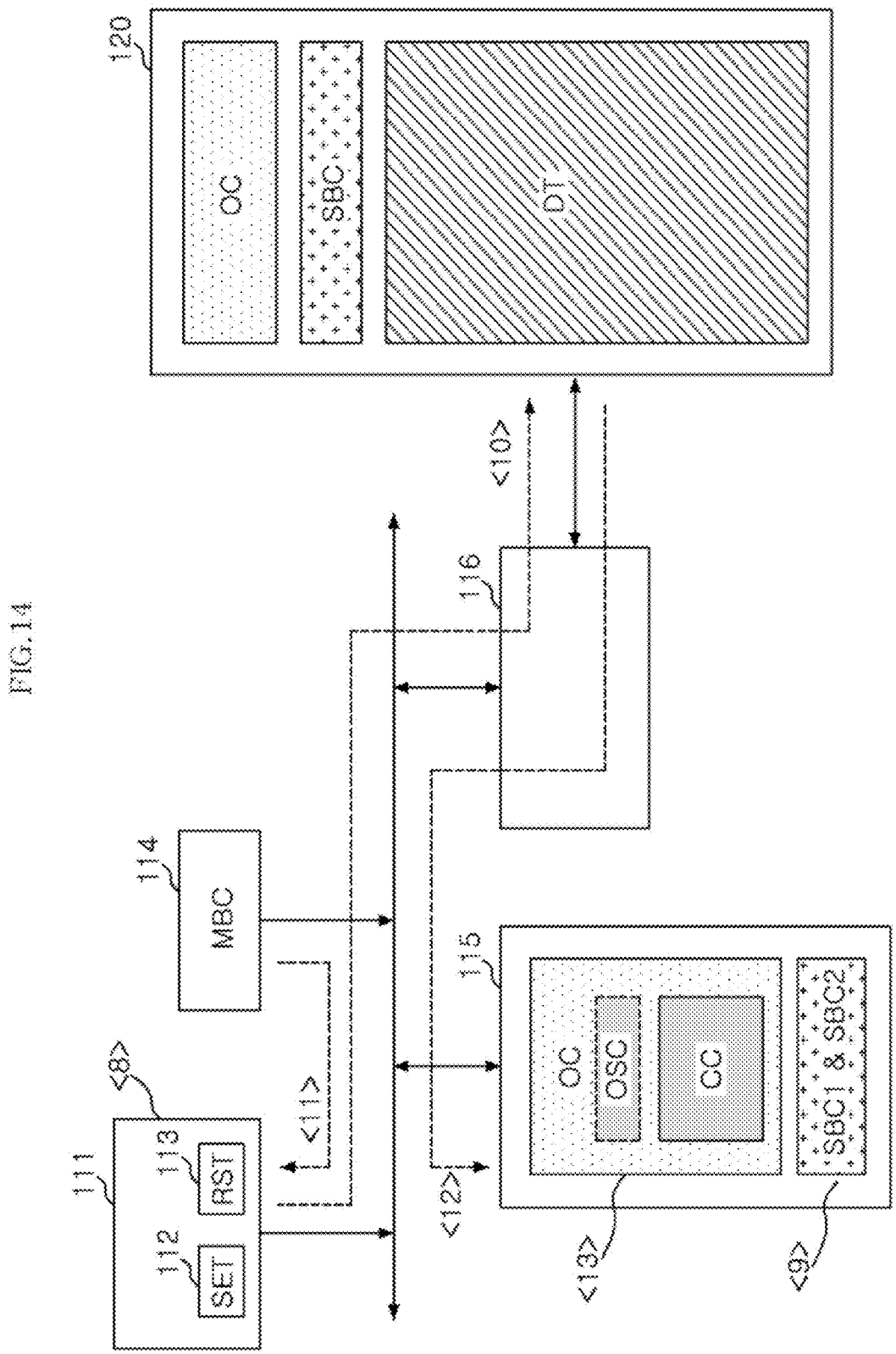
FIG. 14 is a further additional diagram illustrating operations of the data storage device shown in FIG. 11.

In the step S310, the control unit 111 may determine whether the sub boot mode is necessary for waking up from the power saving mode and returning to the normal mode based on the data stored in the power saving mode register 113 (the action <8> of FIG. 14). Since the power saving mode register 113 may be retained in an initialized state, reset data may be stored in the power saving mode register 113. The control unit 111 may determine that the sub boot mode is not for waking up from the power saving mode and returning to the normal mode because the reset data are stored (or found) in the power saving mode register 113.

In step S315, the control unit 111 may execute the first sub boot code SBC1 loaded on the working memory 115 (action <9> of FIG. 14). As described above, the first sub boot code SBC1 may include the code for initializing the nonvolatile memory device 120. Accordingly, the control unit 111 may initialize the nonvolatile memory device 120 through executing the first sub boot code SBC1 (action <10> of FIG. 14).

As the first sub boot code SBC1 is executed earlier than the main boot code MBC by the hardware reset request, a problem may be prevented in that the main boot code MBC is not normally read from the nonvolatile memory device 120 due to malfunction of the data storage device 100.

The control unit 111 may return to the normal mode through executing the main boot code MBC and the operation code OC after the first the sub boot code SBC1 is executed (actions <11> to <13> of FIG. 14).

When the hardware reset is not requested, the process may proceed to step S355. In the step S355, the control unit 111 may determine whether the power saving mode is requested from the host device. When the power saving mode is not requested, the control unit 111 may keep operating in the normal mode until a power-off is requested in step S360 through continuous execution of the continuity code CC. When the power saving mode is requested, the control unit 111 may operate in the power saving mode (step S370).

Figure 15:
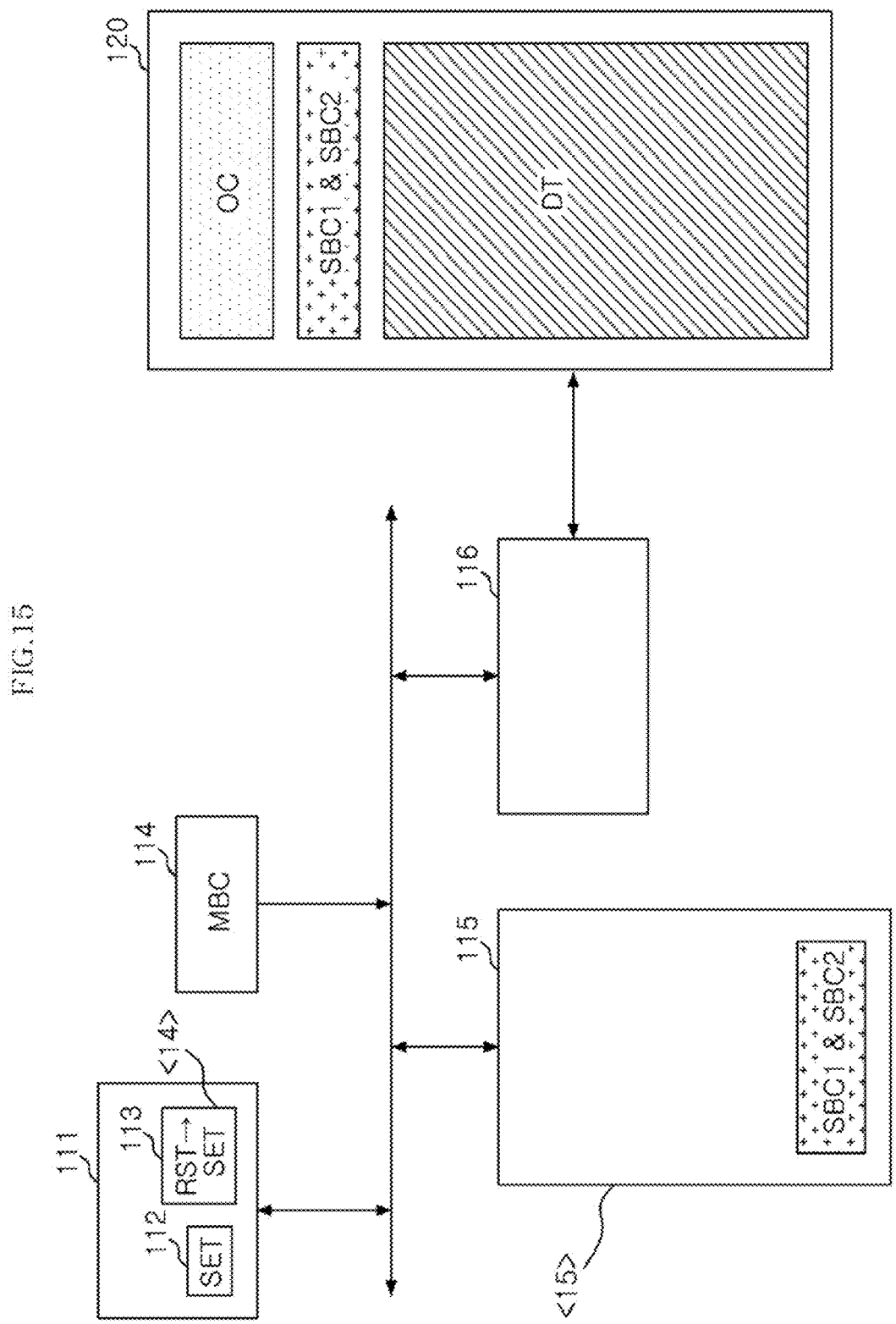
FIG. 15 is a further additional diagram illustrating operations of the data storage device shown in FIG. 11.

In step S371, the control unit 111 may set the power saving mode register 113 (action <14> of FIG. 15). That is to say, the control unit 111 may store set data in the power saving mode register 113 such that a subsequent booting operation (for example, a booting operation performed to wake up from the power saving mode and return to the normal mode) may be performed in the sub boot mode.

In step S372, the control unit 111 may perform preparation work for entry to the power saving mode and may then enter the power saving mode. For instance, the control unit 111 may end all works which are being performed. Further, the control unit 111 may back up the various data, which are stored in the working memory 115, to the nonvolatile memory device 120, and may cut off the power supplied to the internal function blocks including the working memory 115 and the nonvolatile memory device 120. However, power supply to a specified region where the first and second sub boot codes SBC1 and SBC2 are stored may not be cut off but maintained. Thus, the first and second sub boot codes SBC1 and SBC2 may be retained in the working memory 115 (action <15> of FIG. 15).

In step S373, the control unit 111 may determine whether a wake-up is requested from the host device. When the wake-up is not requested, the control unit 111 may keep operating in the power saving mode until the wake-up is requested. When the wake-up is requested, the control unit 111 may perform the booting operation again.

If the booting operation is performed again upon the wake-up request, the process may proceed to the step S305. In the step S305, the control unit 111 may determine which boot mode (the main boot mode or sub boot mode) should be performed based on the data stored in the boot mode register 112 (action <16> of FIG. 16). Because the step S335 was already performed and thus the set data is stored in the boot mode register 112, the control unit 111 may determine that the sub boot mode should be performed and may proceed to the step S310.

Figure 16:
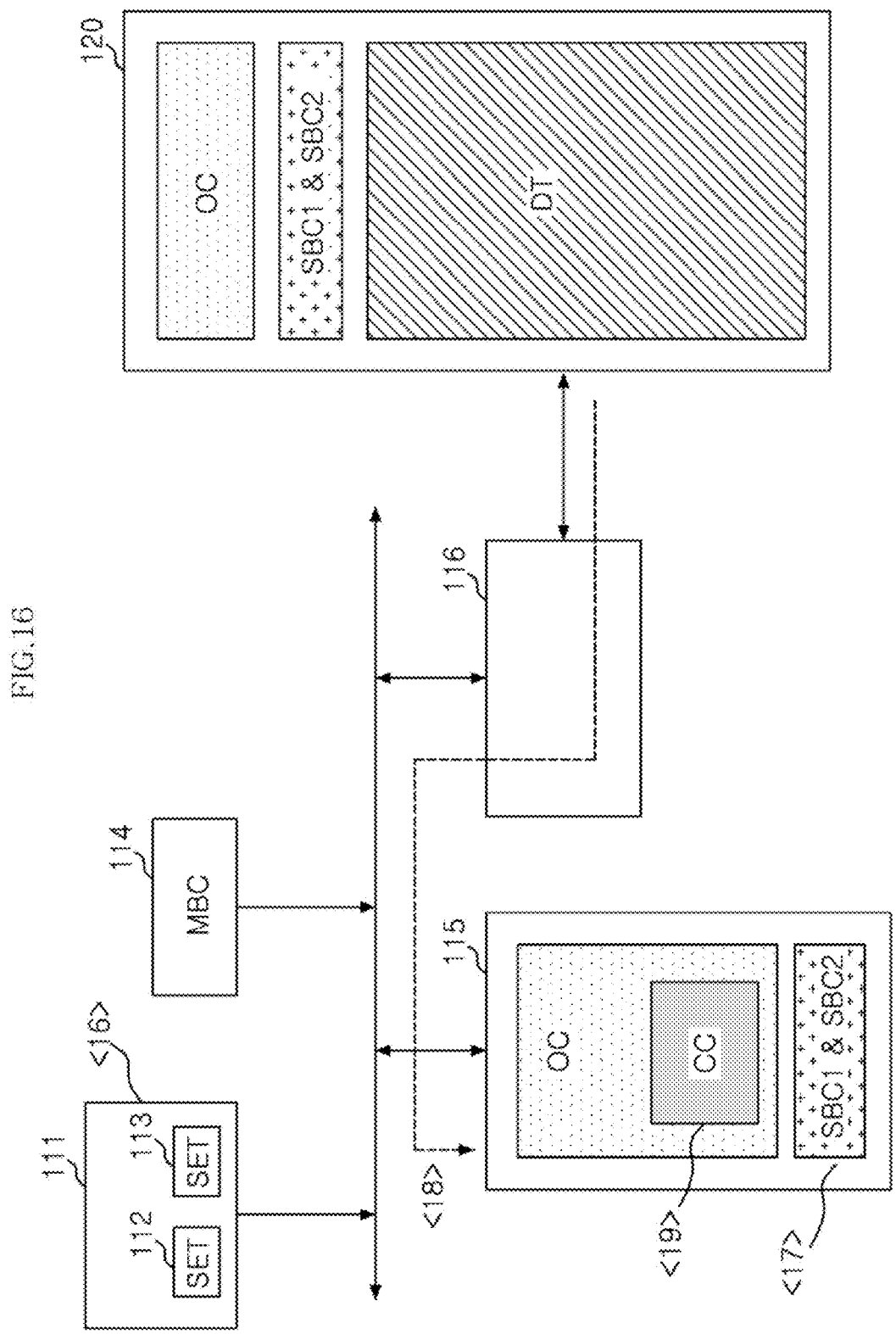
FIG. 16 is a further diagram illustrating operations of the data storage device shown in FIG. 11.

In the step S310, the control unit 111 may determine whether the sub boot mode is necessary for waking up from the power saving mode and returning to the normal mode based on the data stored in the power saving mode register 113 (the action <16> of FIG. 16). Because the step S371 was already performed and thus the set data is stored in the power saving mode register 113, the control unit 111 may determine that the sub boot mode is for waking up from the power saving mode and returning to the normal mode. Thus, the control unit 111 proceeds to step S380.

In the step S380, the control unit 111 may execute the second sub boot code SBC2 loaded on the working memory 115 (action <17> of FIG. 16). As described above, the second sub boot code SBC2 may include the execution code for reading the continuity code CC. Accordingly, the control unit 111 may load only the continuity code CC, which is stored in the nonvolatile memory device 120, on the working memory 115 through executing the second sub boot code SBC2 (action <18> of FIG. 16).

After the second sub boot code SBC2 is executed, the process may be repeated from the step S345 and operate in the normal mode, as described above. In other words, the control unit 111 may wake up from the power saving mode and return to the normal mode through executing the continuity code CC (action <19> of FIG. 16).

Figure 17:
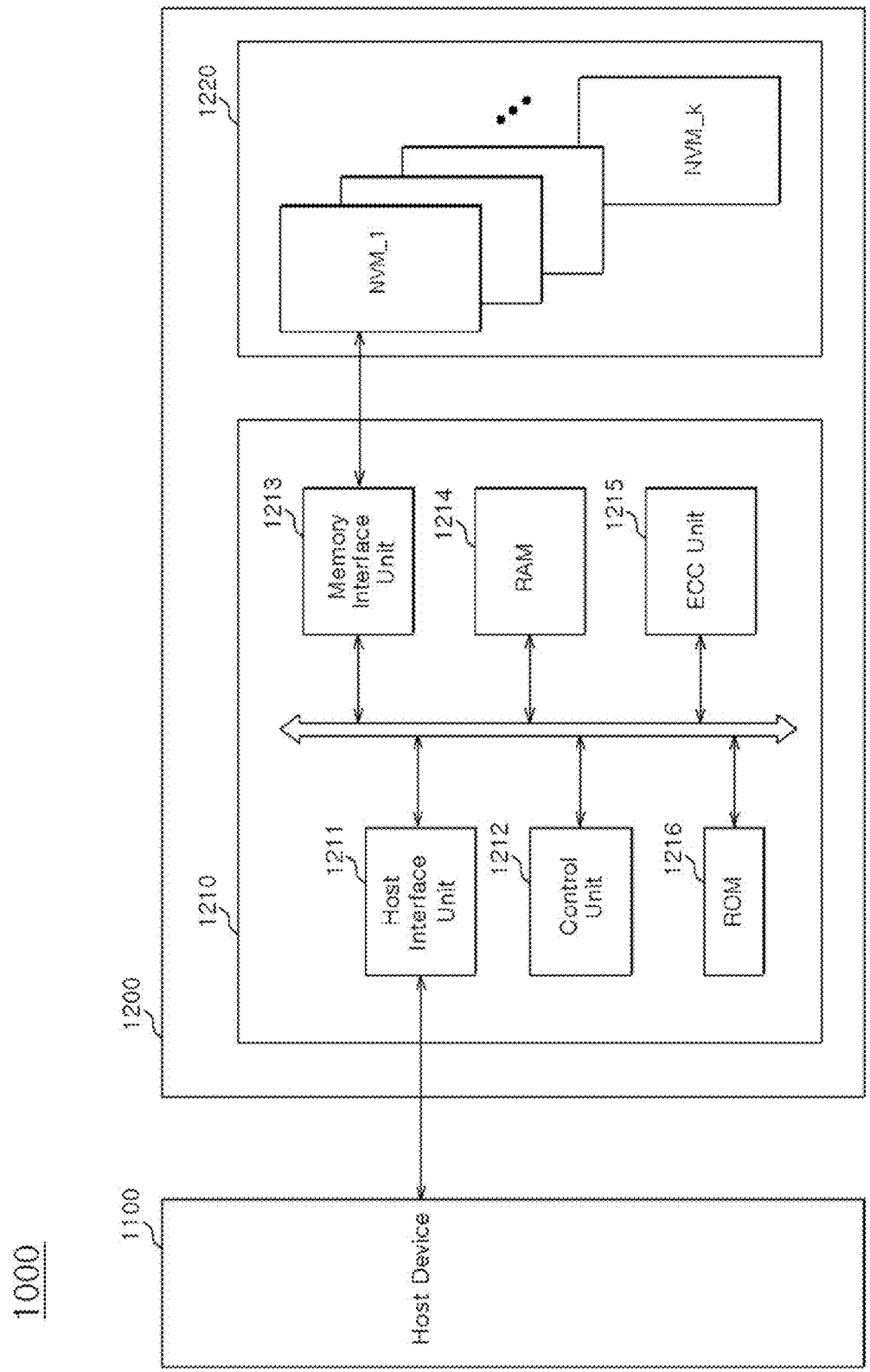
FIG. 17 is a block diagram illustrating a data processing system including a data storage device in accordance an embodiment.

FIG. 17 is a block diagram illustrating a data processing system including a data storage device in accordance an embodiment. Referring to FIG. 17, a data processing system 1000 may include a host device 1100 and a data storage device 1200.

The data storage device 1200 may include a controller 1210 and a nonvolatile memory device 1220. The data storage device 1200 may be electrically coupled to the host device 1100 such as a mobile phone, an MP3 player, a laptop computer, a desktop computer, a game player, a TV, an in-vehicle infotainment system, and so forth.

The controller 1210 may be configured to access the nonvolatile memory device 1220 in response to a request from the host device 1100. For example, the controller 1210 may be configured to control the read, program, or erase operations of the nonvolatile memory device 1220. The controller 1210 may be configured to drive a firmware for controlling the nonvolatile memory device 1220.

The controller 1210 may include a host interface unit 1211, a control unit 1212, a memory interface unit 1213, a RAM 1214, an error correction code (ECC) unit 1215, and a ROM 1216.

The control unit 1212 may be configured to control general operations of the controller 1210 in response to a request from the host device 1100. The control unit 1212 may determine whether a main boot mode or a sub boot mode should be performed. The control unit 1212 may operate in the main boot mode through executing the main boot code stored in the ROM 1216 or perform the sub boot mode on the basis of a determination result.

The RAM 1214 may be used as the working memory of the control unit 1212. The RAM 1214 may be used as a buffer memory which temporarily stores data read from the nonvolatile memory device 1220 or data provided from the host device 1100.

The host interface unit 1211 may be configured to interface the host device 1100 and the controller 1210. For example, the host interface unit 1211 may be configured to communicate with the host device 1100 through various interface protocols such as a universal serial bus (USB) protocol, a universal flash storage (UFS) protocol, a multi-media card (MMC) protocol, a peripheral component interconnection (PCI) protocol, a PCI express (PCI-E) protocol, a parallel advanced technology attachment (PATA) protocol, a serial ATA (SATA) protocol, a small computer system interface (SCSI) protocol, a serial attached SCSI (SAS) protocol, and a combination thereof.

The memory interface unit 1213 may be configured to interface the controller 1210 and the nonvolatile memory device 1220. The memory interface unit 1213 may be configured to provide commands and addresses to the nonvolatile memory device 1220. Furthermore, the memory interface unit 1213 may be configured to exchange data with the nonvolatile memory device 1220.

The error correction code unit 1215 may be configured to detect an error in the data read from the nonvolatile memory device 1220. Also, the error correction code unit 1215 may be configured to correct the detected error when the detected error is correctable or curable.

The nonvolatile memory device 1220 may be used as a storage medium of the data storage device 1200. The nonvolatile memory device 1220 may include a plurality of nonvolatile memory chips (or dies) NVM_1 to NVM_k.

The controller 1210 and the nonvolatile memory device 1220 may be in various configurations. For example, the controller 1210 and the nonvolatile memory device 1220 may be integrated into a single semiconductor device and may form a multimedia card in the form of an MMC, an eMMC, an RS-MMC, and a micro-MMC, a secure digital card in the form of an SD, a mini-SD and an micro-SD, a universal serial bus (USB) storage device, a universal flash storage (UFS) device, a personal computer memory card international association (PCMCIA) card, a compact flash (CF) card, a smart media card, a memory stick, and so forth.

Figure 18:
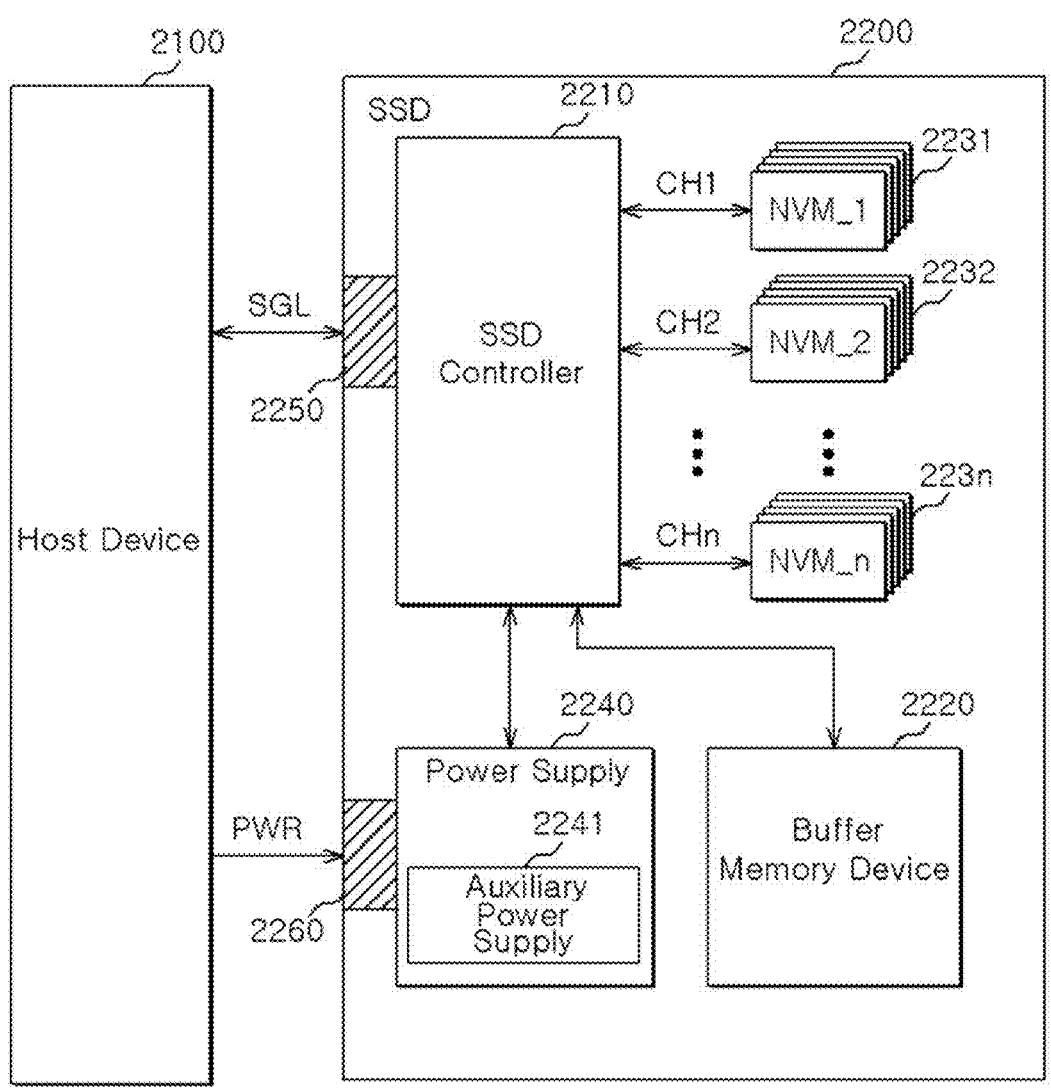
FIG. 18 is a block diagram illustrating a data processing system including a solid state drive (SSD) in accordance with an embodiment.

FIG. 18 is a block diagram illustrating a data processing system including a solid state drive (SSD) in accordance with an embodiment. Referring to FIG. 18, a data processing system 2000 may include a host device 2100 and a solid state drive (SSD) 2200.

The SSD 2200 may include an SSD controller 2210, the buffer memory device 2220, nonvolatile memory devices 2231 to 223n, a power supply 2240, a signal connector 2250, and a power connector 2260.

The SSD 2200 may operate in response to a request from the host device 2100. In other words, the SSD controller 2210 may be configured to access the nonvolatile memory devices 2231 to 223n in response to a request from the host device 2100. For example, the SSD controller 2210 may be configured to control the read, program, and erase operations of the nonvolatile memory devices 2231 to 223n.

The buffer memory device 2220 may be configured to temporarily store data which are eventually stored in the nonvolatile memory devices 2231 to 223n. Further, the buffer memory device 2220 may be configured to temporarily store data which are read from the nonvolatile memory devices 2231 to 223n. The data temporarily stored in the buffer memory device 2220 may be transmitted to the host device 2100 or the nonvolatile memory devices 2231 to 223n under the control of the SSD controller 2210.

The nonvolatile memory devices 2231 to 223n may be used as a storage media of the SSD 2200. The nonvolatile memory devices 2231 to 223n may be electrically coupled to the SSD controller 2210 through a plurality of channels CH1 to CHn, respectively. One or more nonvolatile memory devices may be electrically coupled to one channel. The nonvolatile memory devices electrically coupled to one channel may be electrically coupled to the same signal bus and data bus.

The power supply 2240 may be configured to provide power PWR through the power connector 2260 to the inside of the SSD 2200. The power supply 2240 may include an auxiliary power supply 2241. The auxiliary power supply 2241 may be configured to supply power to allow the SSD 2200 to be normally terminated when a sudden power-off occurs. The auxiliary power supply 2241 may include super capacitors capable of being charged with power PWR.

The SSD controller 2210 may exchange a signal SGL with the host device 2100 through the signal connector 2250. The signal SGL may include a command, an address, data, and so forth. The signal connector 2250 may be configured by a connector such as parallel advanced technology attachment (PATA), serial advanced technology attachment (SATA), small computer system interface (SCSI), serial attached SCSI (SAS), peripheral component interconnection (PCI), and PCI express (PCI-E) protocols according to the interface scheme between the host device 2100 and the SSD 2200.

Figure 19:
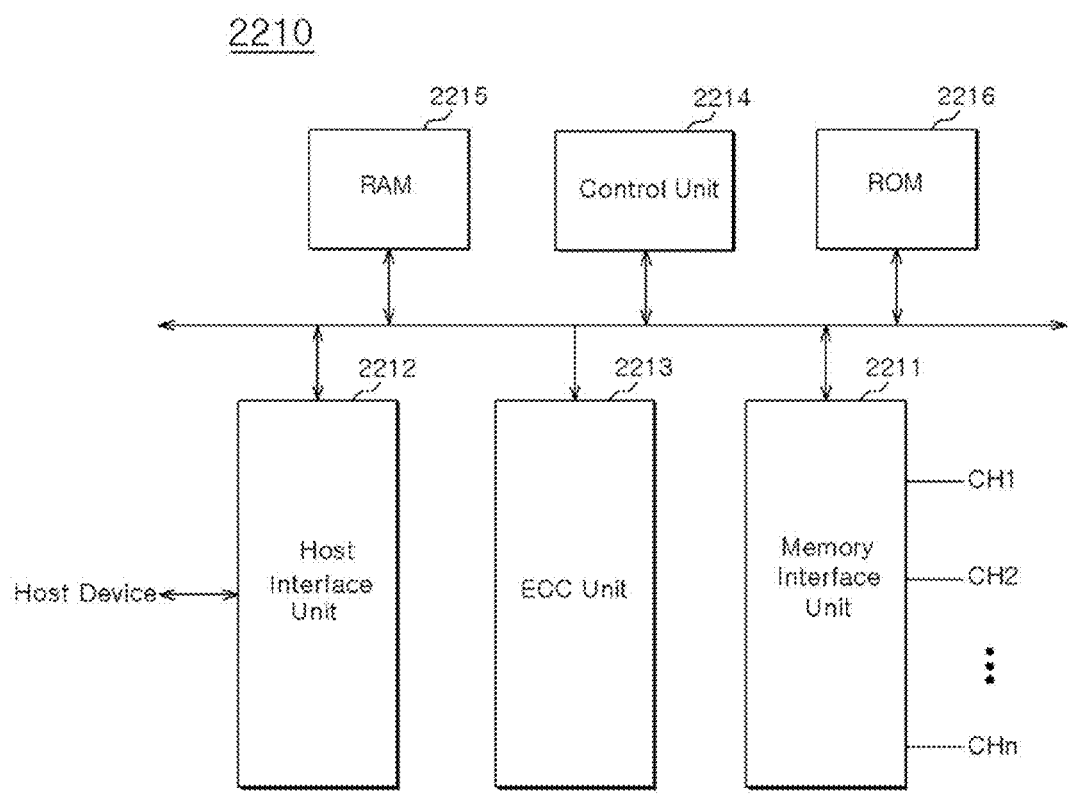
FIG. 19 is a block diagram illustrating an example of the SSD controller shown in FIG. 18.

FIG. 19 is a block diagram illustrating an example of the SSD controller shown in FIG. 18. Referring to FIG. 19, the SSD controller 2210 may include a memory interface unit 2211, a host interface unit 2212, an error correction code (ECC) unit 2213, a control unit 2214, a RAM 2215, and a ROM 2216.

The memory interface unit 2211 may be configured to provide a control signal such as a command and an address to the nonvolatile memory devices 2231 to 223n. Moreover, the memory interface unit 2211 may be configured to exchange data with the nonvolatile memory devices 2231 to 223n. The memory interface unit 2211 may transmit the data transmitted from the buffer memory device 2220 to the respective channels CH1 to CHn under the control of the control unit 2214. Furthermore, the memory interface unit 2211 may transmit the data read from the nonvolatile memory devices 2231 to 223n to the buffer memory device 2220 under the control of the control unit 2214.

The host interface unit 2212 may interface between the SSD 2200 and the host device 2100 in correspondence to a protocol of the host device 2100. For example, the host interface unit 2212 may be configured to communicate with the host device 2100 through parallel advanced technology attachment (PATA), serial advanced technology attachment (SATA), small computer system interface (SCSI), serial attached SCSI (SAS), peripheral component interconnection (PCI), PCI express (PCI-E) protocols, or a combination thereof. In addition, the host interface unit 2212 may perform a disk emulating function of supporting the host device 2100 to recognize the SSD 2200 as a hard disk drive (HDD).

The ECC unit 2213 may be configured to generate parity bits based on the data transmitted to the nonvolatile memory devices 2231 to 223n. The generated parity bits may be stored in spare areas of the nonvolatile memory devices 2231 to 223n. The ECC unit 2213 may be configured to detect errors in the data read from the nonvolatile memory devices 2231 to 223n. When detected errors are correctable, the ECC unit 2213 may be configured to correct the detected errors.

The control unit 2214 may be configured to analyze and process the signal SGL inputted from the host device 2100. The control unit 2214 may control general operations of the SSD controller 2210 in response to a request from the host device 2100. The control unit 2214 may control operations of the buffer memory device 2220 and the nonvolatile memory devices 2231 to 223n according to the firmware for driving the SSD 2200. The RAM 2215 may be used as a working memory for driving the firmware.

The control unit 2214 may determine whether a main boot mode should be performed or a sub boot mode should be performed. The control unit 2214 may operate in the main boot mode through executing the main boot code which is stored in the ROM 2216 or perform the sub boot mode on the basis of the determination result.

Figure 20:
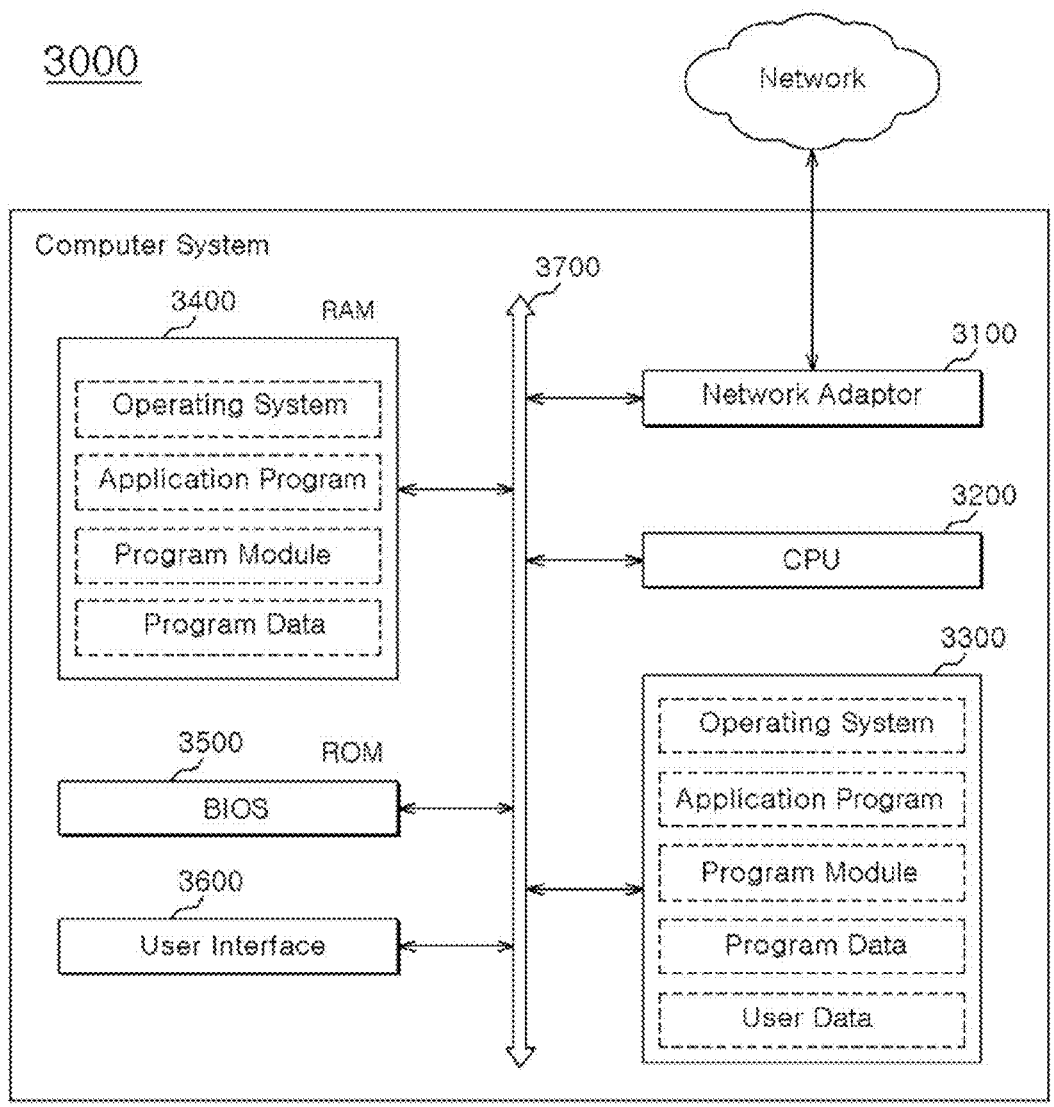
FIG. 20 is a block diagram illustrating a computer system, in which a data storage device is mounted, in accordance with an embodiment.

FIG. 20 is a block diagram illustrating an example of a computer system in which a data storage device is mounted, in accordance with an embodiment. Referring to FIG. 20, a computer system 3000 includes a network adaptor 3100, a central processing unit 3200, a data storage device 3300, a RAM 3400, a ROM 3500, and a user interface 3600 which are electrically coupled to each other through a system bus 3700. The data storage device 3300 may be configured by the data storage device 100 shown in FIG. 1, the data storage device 1200 shown in FIG. 17, or the SSD 2200 shown in FIG. 18.

The network adaptor 3100 provides interfacing between the computer system 3000 and external networks. The central processing unit 3200 performs general operations for driving an operating system of the RAM 3400 or an application program.

The data storage device 3300 stores general data necessary for the computer system 3000. For example, an operating system for driving the computer system 3000, an application program, various program modules, program data, and user data are stored in the data storage device 3300.

The RAM 3400 may be used as a working memory device of the computer system 3000. Upon booting, the operating system, the application program, the various program modules, and the program data necessary for driving programs which are read from the data storage device 3300 are loaded on the RAM 3400. A BIOS (basic input/output system) which is activated before the operating system is driven is stored in the ROM 3500. Information exchange between the computer system 3000 and a user is implemented through the user interface 3600.

While various embodiments have been described above, it will be understood that the embodiments described are presented as examples only. Accordingly, the operating method of a data storage device described in the claims should not be limited to the described embodiments.

What is claimed is:

1. An operating method of a data storage device including a nonvolatile memory device as a storage medium, comprising:

determining whether a main boot mode or a sub boot mode should be performed based on data stored in a boot mode register;

executing a main boot code stored in a read-only-memory (ROM) when it is determined that the main boot mode should be performed; and executing a sub boot code for initializing a bias condition to be used in an internal operation of the nonvolatile memory device loaded on a working memory, when it is determined that the sub boot mode should be performed, and then executing the main boot code.

2. The operating method according to claim 1, wherein the executing of the main boot code comprises:
   loading an operation code stored in a nonvolatile memory device on the working memory.

3. The operating method according to claim 2, further comprising:
   executing the operation code loaded on the working memory.

4. The operating method according to claim 3, wherein the executing of the operation code comprises:
   storing set data for instructing execution of the sub boot mode in the boot mode register; and
   loading the sub boot code on the working memory.

5. The operating method according to claim 4,
   wherein the executing of the operation code further comprises determining whether a hardware reset is requested, and
   wherein the determining of whether the main boot mode or the sub boot mode should be performed is made when it is determined that the hardware reset is requested.

6. An operating method of a data storage device including a nonvolatile memory device as a storage medium, comprising:
   setting a power saving mode register before entering a power saving mode;
   determining whether a main boot mode or a sub boot mode should be performed, based on data stored in the power saving mode register, when the power saving mode changes to a normal mode;
   executing a main boot code stored in a read-only-memory (ROM) when it is determined that the main boot mode should be performed; and
   executing a sub boot code for initializing a bias condition to be used in an internal operation of the nonvolatile memory device retained in a working memory, when it is determined that the sub boot mode should be performed.

7. The operating method according to claim 6, wherein the executing of the sub boot code comprises:
   loading only a continuity operation code, which is continuously executed in the normal mode, on the working memory.

8. The operating method according to claim 6, wherein the executing of the main boot code comprises:
   loading a one-shot operation code, which is executed one time before the normal mode initiates, and a continuity operation code, which is continuously executed in the normal mode, on the working memory.

9. The operating method according to claim 8, further comprising:
   executing the one-shot operation code and the continuity operation code loaded on the working memory.

10. The operating method according to claim 9, wherein the executing of the one-shot operation code comprises:
    loading the sub boot code on the working memory.

11. The operating method according to claim 6, wherein the setting of the power saving mode register comprises:
    storing set data for instructing execution of the sub boot mode in the power saving mode register.

12. An operating method of a data storage device, comprising:
    determining whether a main boot mode or a sub boot mode should be performed, based on data stored in a boot mode register;
    executing a main boot code stored in a ROM when it is determined that the main boot mode should be performed;
    determining whether a current mode is a power saving mode, based on data stored in a power saving mode register, when it is determined that the sub boot mode should be performed;
    executing a first sub boot code stored in a working memory when it is determined that the current mode is not the power saving mode; and
    executing a second sub boot code stored in the working memory when it is determined that the current mode is the power saving mode.

13. The operating method according to claim 12, wherein the executing of the first sub boot code comprises:
    initializing a nonvolatile memory device.

14. The operating method according to claim 13, wherein the executing of the first sub boot code comprises:
    initializing a bias condition which is used in an internal operation of the nonvolatile memory device.

15. The operating method according to claim 12, wherein the executing of the second sub boot code comprises:
    loading only a continuity operation code, which is continuously executed in a normal mode, on the working memory.

16. The operating method according to claim 12, wherein the executing of the main boot code comprises:
    loading a one-shot operation code, which is executed one time before the normal mode initiates, and a continuity operation code, which is continuously executed in the normal mode, on the working memory.

17. The operating method according to claim 16, further comprising:
    executing the one-shot operation code and the continuity operation code.

18. The operating method according to claim 17, wherein the executing of the one-shot operation code comprises:
    storing set data for instructing execution of the sub boot mode in the boot mode register; and
    loading the first sub boot code and the second sub boot code on the working memory.

19. The operating method according to claim 17, wherein the executing of the continuity operation code comprises:
    determining whether a hardware reset is requested or not, and
    determining whether the power saving mode is requested or not.

20. The operating method according to claim 19, wherein the determining of whether the main boot mode or the sub boot mode is performed is made when it is determined that the hardware reset is requested.

21. The operating method according to claim 19, further comprising:
    storing set data, which indicates that the current mode is the power saving mode, in the power saving mode register, and
    entering the power saving mode when it is determined that the power saving mode is requested.

* * * * *